United States Patent
Waller, Jr. et al.

(10) Patent No.: US 12,515,174 B2
(45) Date of Patent: Jan. 6, 2026

(54) ARTICLES INCLUDING AN ISOPOROUS MEMBRANE DISPOSED ON A POROUS SUBSTRATE AND METHODS OF MAKING THE SAME

(71) Applicant: Solventum Intellectual Properties Company, Maplewood, MN (US)

(72) Inventors: Clinton P. Waller, Jr., White Bear Lake, MN (US); Michelle M. Mok, St. Paul, MN (US); Lucas D. McIntosh, Minneapolis, MN (US); Timothy M. Gillard, St. Paul, MN (US); Carl A. Laskowski, Minneapolis, MN (US); Hyacinth L. Lechuga, St. Paul, MN (US)

(73) Assignee: SOLVENTUM INTELLECTUAL PROPERTIES COMPANY, Maplewood, MN (US)

( * ) Notice: Subject to any disclaimer, the term of this patent is extended or adjusted under 35 U.S.C. 154(b) by 403 days.

(21) Appl. No.: 17/766,395

(22) PCT Filed: Dec. 8, 2020

(86) PCT No.: PCT/IB2020/061634
§ 371 (c)(1),
(2) Date: Apr. 4, 2022

(87) PCT Pub. No.: WO2021/124011
PCT Pub. Date: Jun. 24, 2021

(65) Prior Publication Data
US 2024/0066473 A1 Feb. 29, 2024

(51) Int. Cl.
*B01D 69/02* (2006.01)
*B01D 67/00* (2006.01)
(Continued)

(52) U.S. Cl.
CPC ......... *B01D 69/02* (2013.01); *B01D 67/0013* (2013.01); *B01D 69/107* (2022.08);
(Continued)

(58) Field of Classification Search
CPC . B01D 69/02; B01D 71/80; B01D 2325/0212
See application file for complete search history.

(56) References Cited

U.S. PATENT DOCUMENTS

| RE27,145 E | 6/1971 | Jones |
|---|---|---|
| 4,039,593 A | 8/1977 | Kamienski et al. |

(Continued)

FOREIGN PATENT DOCUMENTS

| CN | 108273400 | 7/2018 |
|---|---|---|
| DE | 102012207344 | 11/2013 |

(Continued)

OTHER PUBLICATIONS

Abetz, "Isoporous Block Copolymer Membranes", Macro Molecular Rapid Communications, Jan. 2015, vol. 36, No. 1, pp. 10-22. XP55497269A.

(Continued)

*Primary Examiner* — Bradley R Spies
(74) *Attorney, Agent, or Firm* — HYLTON-RODIC LAW PLLC

(57) ABSTRACT

The present disclosure provides an article including an isoporous membrane disposed on a porous substrate. The isoporous membrane includes a triblock copolymer or a pentablock copolymer. The isoporous membrane has a thickness and is isoporous throughout its thickness. A method of making an article is also provided, which does not require a solvent exchange process. The method includes depositing a composition on a porous substrate, thereby forming a film, and removing at least a portion of the solvent from the film, thereby forming an isoporous membrane (Continued)

having numerous pores. The composition contains a solvent and solids including a triblock copolymer or a pentablock copolymer. The article advantageously can be hydrophilic and provides sharp molecular weight cut-offs and high flux.

10 Claims, 10 Drawing Sheets

(51) Int. Cl.
  *B01D 69/10* (2006.01)
  *B01D 69/12* (2006.01)
  *B01D 71/26* (2006.01)
  *B01D 71/28* (2006.01)
  *B01D 71/52* (2006.01)
  *B01D 71/80* (2006.01)

(52) U.S. Cl.
  CPC ............. *B01D 69/12* (2013.01); *B01D 71/26* (2013.01); *B01D 71/281* (2022.08); *B01D 71/283* (2022.08); *B01D 71/521* (2022.08); *B01D 71/5211* (2022.08); *B01D 71/80* (2013.01); *B01D 2325/0212* (2022.08); *B01D 2325/02832* (2022.08); *B01D 2325/02833* (2022.08); *B01D 2325/04* (2013.01)

(56) References Cited

U.S. PATENT DOCUMENTS

| | | | |
|---|---|---|---|
| 5,321,148 | A | 6/1994 | Schwindeman |
| 5,750,055 | A | 5/1998 | Van Der Steen et al. |
| 6,160,054 | A | 12/2000 | Schwindeman et al. |
| 6,184,338 | B1 | 2/2001 | Schwindeman et al. |
| 6,197,891 | B1 | 3/2001 | Schwindeman et al. |
| 6,221,991 | B1 | 4/2001 | Letchford et al. |
| 6,492,469 | B2 | 12/2002 | Willis et al. |
| 7,438,193 | B2 | 10/2008 | Yang et al. |
| 7,884,160 | B2 | 2/2011 | Wang et al. |
| 10,174,171 | B2 | 1/2019 | Bell et al. |
| 2015/0336058 | A1 | 11/2015 | Hillmyer et al. |

FOREIGN PATENT DOCUMENTS

| | | |
|---|---|---|
| EP | 2949382 | 12/2015 |
| EP | 3056260 | 2/2020 |
| WO | WO 2018-097988 | 5/2018 |
| WO | WO 2018-098023 | 5/2018 |
| WO | WO 2018-204862 | 11/2018 |

OTHER PUBLICATIONS

Bucher, "Formation of Thin, Isoporous Block Copolymer Membranes by an Upscalable Profile Roller Coating Process—A Promising Way to Save Block Copolymer", Membranes, Aug. 2018, vol. 8, No. 3, 22 pages. XP055784109A.
Chowdhury, "3D Printed Polyamide Membranes for Desalination", Science, Aug. 17, 2018, vol. 361, No. 6403, pp. 682-686.
Cohen, "Cobalt Catalysts for the Alternating Copolymerization of Propylene Oxide and Carbon Dioxide: Combining High Activity and Selectivity", Journal of the American Chemical Society, 2005, vol. 127, No. 31, pp. 10869-10878.
Hahn, "Thin Isoporous Block Copolymer Membranes: It is All about the Process", Applied Materials & Interfaces, 2015, vol. 7, No. 38, pp. 21130-21137. XP55560406A.
Hsieh, Anionic Polymerization, 93-127 (1996).
Hsieh, Anionic Polymerization, 641-684 (1996).
Green, Protective Groups in Organic Synthesis, 41 (1991).
Green. Protective Groups in Organic Synthesis, 80-83 (1991).
Kesting, Synthetic Polymeric Membranes (1985).
Kawakami, "Silicone Macromers for Graft Polymer Synthesis", 1982, Polymer Journal, vol. 14, No. 11, pp. 913-917.
Kawakami, "Synthesis and Copolymerization of Polysiloxane Macromers,", ACS Polymer Preprints, 1984, vol. 25, No. 1, pp. 245.
Kawakami, "Synthesis of silicone graft polymers and a study of their surface active properties", Makromol. Chem. 1984, vol. 185, pp. 9-18.
Ma, Block copolymer ultrafiltration membranes by spray coating coupled with selective swelling, Journal of Membrane Science, Mar. 2019, vol. 598, 32 pages.
Ndoni, "Laboratory-scale setup for anionic polymerization under inert atmosphere", Review of Scientific Instruments, 1995, vol. 66, No. 2, pp. 1090-1095.
Philip, "Analysis of Petroleum Crude and Distillates by Gel Permeation Chromatography", ACS Symposium Series, 1984, vol. 245, pp. 257-270.
Su, Principles of Polymer Design and Synthesis, 267-299 (2013).
Yu, "Asymmetric block copolymer membranes with ultrahigh porosity and hierarchical pore structure by plain solvent evaporation", Chemical Communications, 2016, vol. 52, pp. 12064-12067.
International Search Report for PCT Application No. PCT/IB2020/061634 mailed on Mar. 19, 2021, 5 pages.

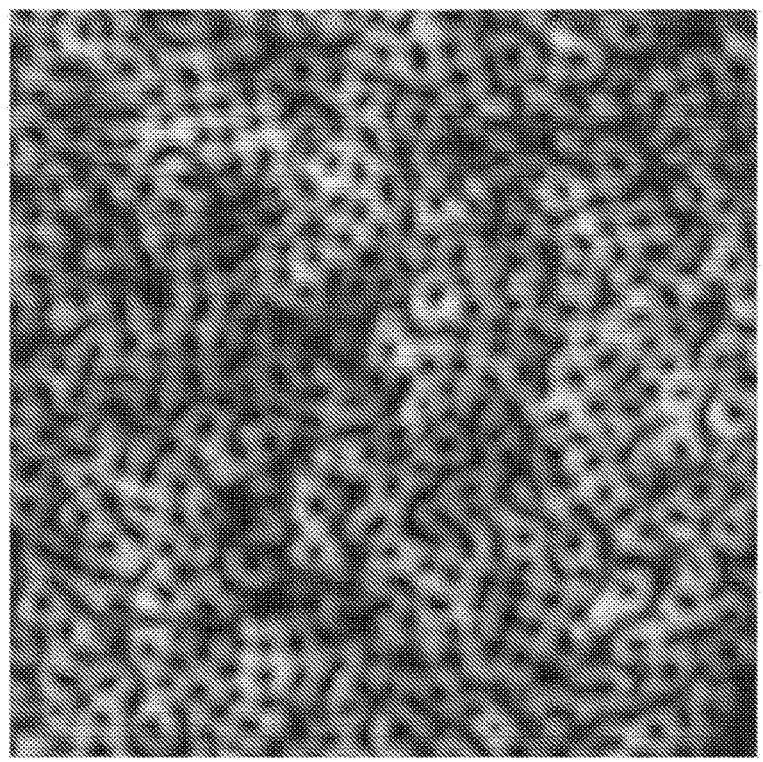
*FIG. 3A*  200.0 nm
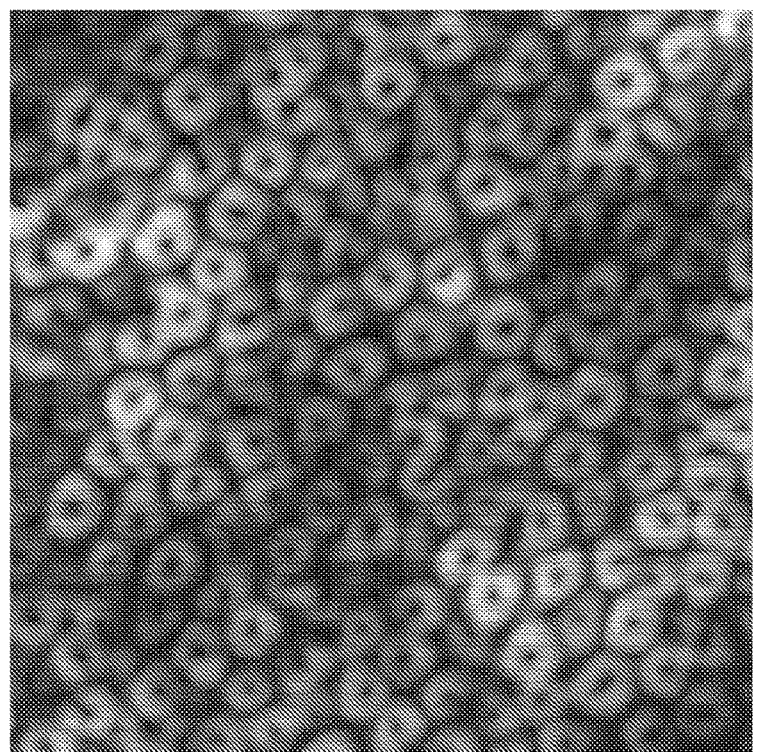
*FIG. 3B*  200.0 nm

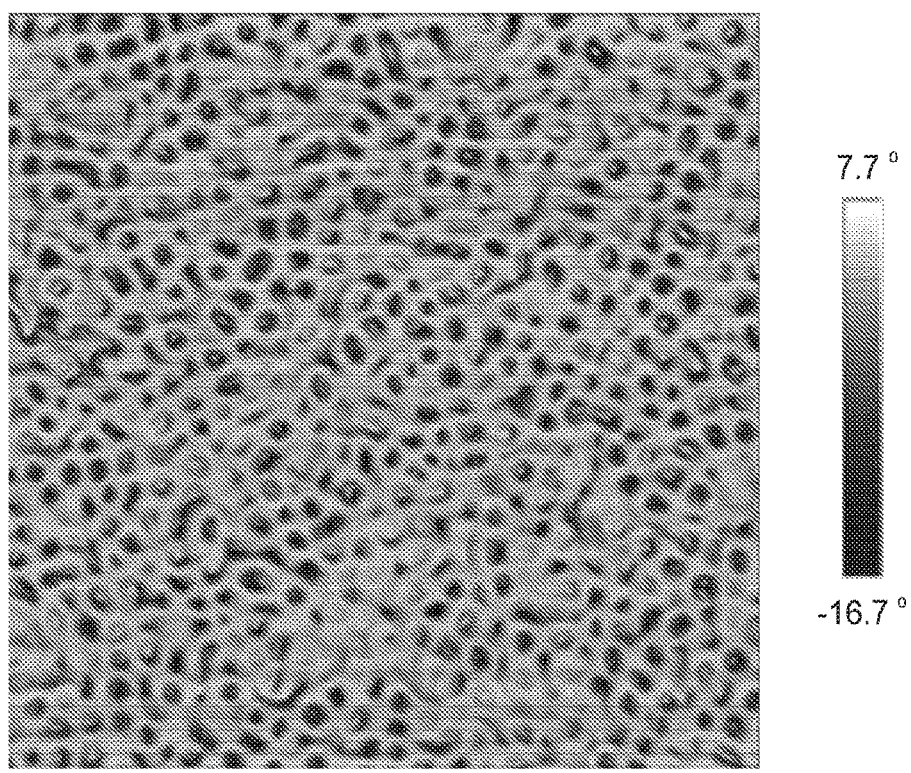
FIG. 4A
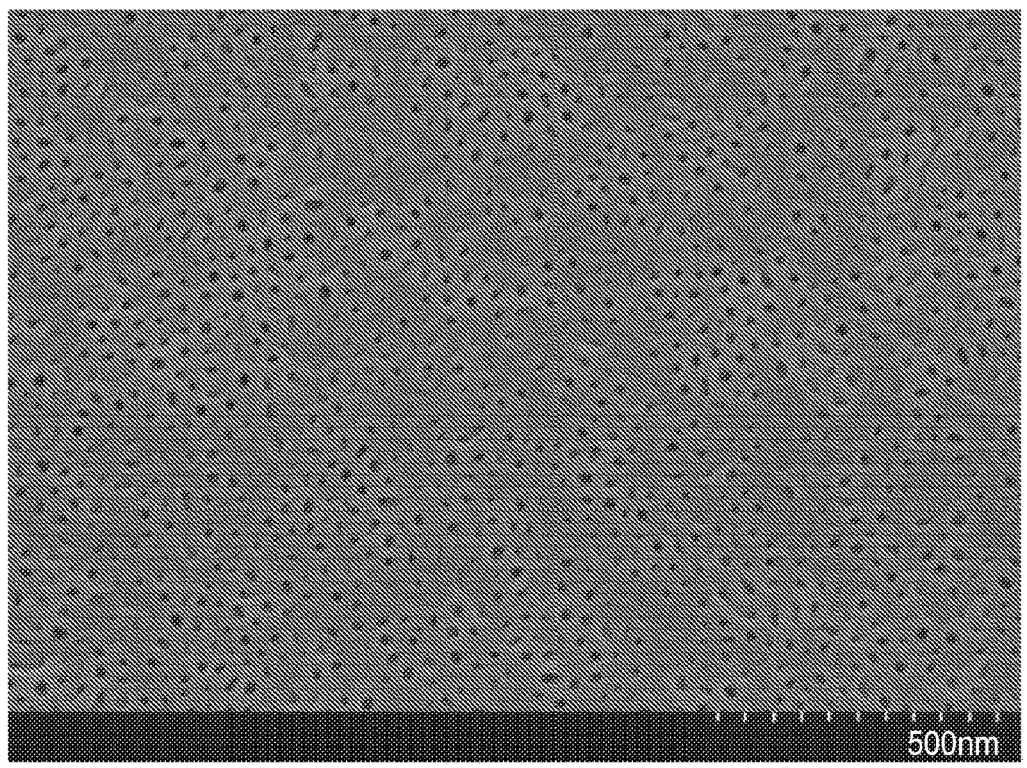
FIG. 4B 1.00µm

ARTICLES INCLUDING AN ISOPOROUS MEMBRANE DISPOSED ON A POROUS SUBSTRATE AND METHODS OF MAKING THE SAME

BACKGROUND

Porous materials are materials that have porous structures that enable fluids to pass readily through them. Porous membranes enjoy utility in a wide range of divergent applications, including use in fluid filtration to remove solid particulates, use in ultrafiltration to remove colloidal matter from fluids, use as diffusion barriers or separators in electrochemical cells, and uses in gas separation and pervaporation. Porous membranes have also been used in the filtration of antibiotics, beers, oils, bacteriological broths, and for the analysis of air, microbiological samples, intravenous fluids and vaccines. Further advances in porous membranes would be desirable.

SUMMARY

The present disclosure provides an article comprising an isoporous membrane and a method of making the article.

In a first aspect, an article is provided. The article includes an isoporous membrane disposed on a porous substrate. The isoporous membrane includes a triblock copolymer or a pentablock copolymer. The isoporous membrane has a thickness and is isoporous throughout its thickness.

In a second aspect, a method of making an article is provided. The method includes a) depositing a composition on a porous substrate, thereby forming a film; and b) removing at least a portion of the solvent from the film, thereby forming an isoporous membrane having a plurality of pores. The composition includes a solvent and solids including a triblock copolymer or a pentablock copolymer. The isoporous membrane has a thickness and is isoporous throughout its thickness.

Specifically, the articles have the potential to display improvements in flux and size exclusion at a given pore size due to the isoporosity of the isoporous membrane, which is in contrast to porous membranes that have a broad pore size distribution. Further, some methods advantageously do not require the use of a solvent exchange phase inversion step, such as used in solvent-induced phase separation (SIPS). Additional features and advantages of the present disclosure will be further understood upon consideration of the detailed description as well as the appended claims.

BRIEF DESCRIPTION OF DRAWINGS

FIG. 3A is an AFM topography image of a surface of the article of EX 96

FIG. 3B is an AFM topography image of a surface of the article of EX 100.

FIG. 4A is an AFM phase image of a surface of the article of EX 102.

FIG. 4B is an SEM image at a magnification of 70,000× of a surface of the article of EX 102.

Figure 1A:
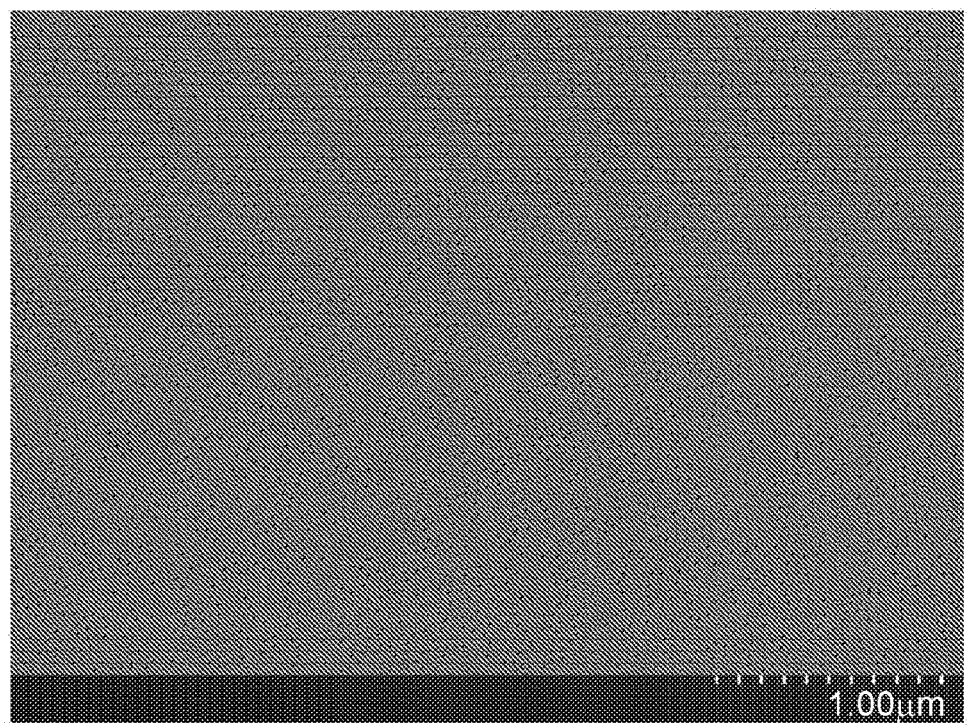
FIG. 1A is a scanning electron microscope (SEM) image at a magnification of 30,000× of a surface of the article of EX 77.

While the above-identified figures set forth several embodiments of the disclosure, other embodiments are also contemplated, as noted in the description. The figures are not necessarily drawn to scale. Not every feature is illustrated in each figure. In all cases, this disclosure presents embodiments by way of representation and not limitation.

DETAILED DESCRIPTION

The present disclosure generally provides thin film composite articles including an isoporous membrane disposed on a porous support substrate. The articles exhibit one or more advantageous properties of being flexible, durable, hydrophilic, and/or having a selective isoporous active layer. The more uniform the isopores of the membrane, the sharper the molecular weight cut-off curve will be when filtering out solutes through the article.

In a first aspect, an article is provided, the article comprising: an isoporous membrane disposed on a porous substrate, the isoporous membrane comprising a triblock copolymer or a pentablock copolymer, wherein the isoporous membrane has a thickness and is isoporous throughout the thickness.

In a second aspect, a method of making an article is provided, the method comprising:
  a) depositing a composition on a porous substrate, the composition comprising a solvent and solids comprising a triblock copolymer or a pentablock copolymer, thereby forming a film; and
  b) removing at least a portion of the solvent from the film, thereby forming an isoporous membrane comprising a plurality of pores, wherein the isoporous membrane has a thickness and is isoporous throughout the thickness.

The below disclosure relates to both the first aspect and the second aspect.

As used herein the term "isoporous" refers to having approximately the same pore size. It has been discovered that it is possible to form an isoporous membrane on a porous substrate in which the isoporous membrane is isoporous throughout the thickness of the deposited membrane. In contrast, prior isoporous membranes formed on a porous substrate had isoporosity at one major surface and potentially partially through the thickness of the membrane, but also a portion of the thickness disposed on the porous substrate was not isoporous. For instance, Yu et al. describe in "Asymmetric block copolymer membranes with ultrahigh porosity and hierarchical pore structure by plain solvent evaporation" (Chem. Commun., 2016, 52, 12064-12067) formation of a flexible membrane having a "thin top layer with highly ordered . . . and uniform pores on top of a sponge-like microporous layer". Similarly, patent application publication DE102012207344A1 (Volkan et al.) discloses forming a membrane that has an isoporous layer that directly transition to a sponge-like structure created by immersion in a precipitation bath. Hahn et al. also disclose in "Thin Isoporous Block Copolymer Membranes: It is All about the Process" (ACS Appl. Mater. Interfaces, 2015, 7, 21130-21137) that "To fully exploit the potential of narrow pore size distribution and the high porosity on the surface layer of the block copolymer membranes, we should reduce the thickness and density of the substructure." Hahn et al. reports formation of membranes having an average thickness of 1-3 micrometers. One method of forming a block copolymer (BCP) membrane having nanopores throughout from a diblock copolymer, is described by Ma et al. in "Block copolymer ultrafiltration membranes by spray coating coupled with selective swelling" (Journal of Membrane Science (2019), doi: https://doi.org/10.1016/j.memsci.2019.117656). Ma et al. discloses that a "BCP-coated supported was then soaked in hot ethanol to create nanoporosity in the BCP layer following the mechanism of selective swelling-induced pore generation."

Methods according to the present disclosure, however, were unexpectedly discovered to form isoporous membranes having isoporosity throughout their thickness instead of having a (e.g., spongy) substructure. More particularly, it has been found that capillary action can be leveraged to assist in forming a thin isoporous membrane on a supporting porous substrate, in which the isoporous membrane lacks a substructure that is not isoporous. Rapid removal of solvent through wicking into the porous substrate helps cause rapid concentration of block copolymer particles at the surface of the porous substrate and forms a membrane that is isoporous throughout its thickness. This phenomenon was discovered to occur for thin coatings from compositions (e.g., dispersions) of triblock or pentablock copolymers but not for thicker coatings. It was also shown where coating an equivalent solution onto a dense substrate where wicking cannot take place does not give the isoporous structure that is seen when coating on a porous substrate. Without wishing to be bound by theory, it is believed that each supporting substrate has its own fluid capacity limit that will slow down wicking of the solvent once that limit has been reached, and for thicker coating heights the capillary action cannot affect the solvent system at the top surface of a thick coating. A certain amount of solvent may also be removed via evaporation from the composition, but it appears that the wicking occurs so rapidly that the wicking effect dominates the membrane formation. Isopores in a structure forming due to capillary removal of solvents were not found to be adversely affected by the presence of solvents present in the pores of the support substrate and remained intact because of short dwell time from the use of solvents with low boiling point, high vapor pressure (e.g., exhibiting fast evaporation) or quick immersion in water if high boiling point solvents (e.g., exhibiting slow evaporation) are used. In some embodiments, the method can further comprise washing out high boiling point residual solvents from the isoporous membrane and porous substrate using a nonsolvent (e.g., water). This may be useful because certain solvents can start to rearrange the block copolymer orientation and/or degrade the structure of the isoporous membrane if allowed to remain in the article.

Accordingly, methods of the present disclosure preferably comprise removal of solvent by wicking of the solvent into the porous substrate. In any method of the present disclosure, removal of solvent from a composition deposited on a porous substrate comprises wicking and optionally also evaporation of at least a portion of the solvent for a time of 1 second or greater, 5 seconds or greater, 10 seconds or greater, 15 seconds or greater, 20 seconds or greater, 25 seconds or greater, or 30 seconds or greater; and for a time of 600 seconds or less, 500 seconds or less, 400 seconds or less, 300 seconds or less, 200 seconds or less, 100 seconds or less, 80 seconds or less, 60 seconds or less, 50 seconds or less, or 40 seconds or less. It is noted that full drying (e.g., evaporation) of solvents from the article may take more than 24 hours.

In any method of the present disclosure, the solids of the composition are present in an amount of 0.1 weight percent (wt %) or greater of the total composition, 0.2 wt % or greater, 0.3 wt % or greater, 0.4 wt % or greater, 0.5 wt % or greater, 1.0 wt % or greater, 1.5 wt % or greater, or 2.0 wt % or greater; and 7 wt % or less, 6 wt % or less, 5 wt % or less, 4 wt % or less, or 3 wt % or less of the total composition.

Optionally, the solids further comprise at least one additive, either present in a block copolymer solution or intentionally added to the composition. For example, such additives may comprise for instance and without limitation, one or more of a homopolymer, a diblock polymer, or triblock polymer in an amount ranging from 1 to 49 wt % of the total solids, inclusive.

In any method of the present disclosure, the composition containing the triblock copolymer or the pentablock copolymer is cast onto a porous substrate using a bar gap height of 1 micrometer or greater, 12.5 micrometers or greater, 15 micrometers or greater, 25 micrometers or greater, 35 micrometers or greater, 50 micrometers or greater, or 60 micrometers or greater; and using a bar gap height of 100 micrometers or less, 88 micrometers or less, 85 micrometers or less, 75 micrometers or less, or 65 micrometers or less.

As an alternative to casting, the composition containing the triblock copolymer or the pentablock copolymer can be deposited onto a porous substrate using electrospray deposition or inkjet printing. Each of electrospray deposition and inkjet printing may independently deposit the composition at a thickness of 20 nanometers to 1000 nanometers, inclusive. One suitable electrospray deposition apparatus is described in Chowdhury et al. in "3D Printed Polyamide Membranes for Desalination" (Science, 2018, 361 (6403), 682-686). Typically, inkjet printing provides a drop spacing of 360 to 1200 drops per square inch, inclusive (21.2 to 70.5 drops per square micrometers), and a drop volume of 1 to 70 picoliters (pL). One suitable inkjet printer is available under the trade designation "DIMATIX MATERIALS PRINTER" from FUJIFILM Dimatix, Inc., (Santa Clara, CA).

A traditional method for producing isoporous membranes has been reported using SIPS, as noted above. In this method, a block copolymer solution is cast into a wet film, subjected to an evaporation step in which the block copolymer concentration in the film increases, and quenched in an aqueous nonsolvent bath to precipitate the polymer and form a porous solid film. As a consequence of the traditional SIPS process with block copolymers, the resulting film forms an isoporous surface structure supported by a non-isoporous spongy layer of the same material.

The traditional SIPS phase inversion method generally uses a high concentration of polymer in the casting solution such that about 10-30 wt % is comprised of polymer. The viscosity of the casting solution is typically high as a result of the high concentration of polymer. The coating solution is almost always formulated to yield a homogenous single-phase solution. "The casting solution must be viscous (equal or greater than 10^4 cps) to maintain integrity at the moment of immersion into a nonsolvent." (Synthetic Polymer Membranes A Structural Perspective, 2nd Edition, Robert E Kesting, John Wiley and Sons, 1985.)

Methods of the present disclosure differ from the traditional SIPS process. Thin film composites result from depositing compositions containing less than 7 wt % block copolymer onto a substrate that is porous. The block copolymers coalesce as a film at or near the surface of the porous substrate when deposited on the porous substrate, as opposed to conformally coating the porous substrate. Despite the lower content of block copolymer relative to traditional SIPS, the coating composition is formulated to yield a minimum mixture of free polymer chains, and mostly colloidal block copolymer particles such as, polymer micelles or polymer aggregates wherein the volume of polymer free chains is substantially minor and the volume of the polymer particles is increased relative to the casting solutions suitable for traditional SIPS with block copolymer, as determined by a suitable analytical method (such as dynamic light scattering (DLS)). A composition according to the present disclosure is considered to be a dispersion if it contains 20 percent by volume (vol %) or greater of the total block copolymers present as particles, such as 25 vol % or greater, 30 vol % or greater, 35 vol % or greater, 40 vol % or greater, 45 vol % or greater, 50 vol % or greater, 55 vol % or greater, 60 vol % or greater, 65 vol % or greater, 70 vol % or greater, or 75 vol % or greater of the total block copolymers present as particles in the composition; and 100 vol % or less, 99.9 vol % or less, 99.5 vol % or less, 99 vol % or less, 95 vol % or less, or 90 vol % or less of the total block copolymers present as particles in the composition. Preferably, a dispersion contains greater than 50 vol % of the total block copolymers as particles (i.e., a majority).

Depositing (e.g., casting) compositions that are useful in these methods often scatter visible light and appear turbid or cloudy by visual inspection or will scatter light from a red laser if the composition appears clear or transparent. See, e.g., page 411, Figure 13.2 demonstrating the Tyndall effect as well as the entire Chapter 13 of "Physical Properties of Colloids and Solutions, General Chemistry Principles and Structure", $5^{th}$ Edition, John Wiley and Sons, James E. Brady, 1990. Surprisingly, it was found that triblock and pentablock copolymers that incorporate one or more hydrophilic blocks readily formed hydrophilic isoporous membranes when used as a low solids content, low viscosity composition applied to a porous substrate. This was surprising at least because guidelines for traditional SIPS membrane generation with isopore formation were not followed. More particularly, isoporous membrane formation was discovered to be improved when starting with a dispersion (e.g., micelles or micelle aggregates in the solvent) instead of starting with the block copolymer largely dissolved in solution. Advantages of methods of the present disclosure in some embodiments include very dilute compositions (e.g., dispersions), low boiling solvent is not required for the composition, evaporation of a solvent is not required, a delay before a water washing step is not required, and the water immersion step of traditional SIPS can be eliminated.

As used herein, a "block copolymer dispersion" is a polymer mixture in which the block copolymer is microscopically dispersed as insoluble or partially soluble particles that are uniformly suspended throughout a solvent. It is to be understood that the term "solvent" refers to both a single solvent and a combination of two or more solvents, unless specified otherwise. The block copolymer dispersion preferably does not settle. Dynamic light scattering (DLS) may be used to determine whether a block copolymer is present as free chains, micelles, or aggregates. Preferably, a majority of the solids in dispersions according to the present disclosure are present in a form of micelles or aggregates of micelles.

Since a dispersion contains aggregates and micelles dispersed in a liquid, the particles will not diffuse through a porous substrate that has pores with a size smaller than the particle dimensions because of size exclusion mechanism. In contrast, for a solution, the dissolved copolymer molecules will diffuse more easily through the porous membrane. The larger the size of the particles, the larger the pore of the supporting membrane can be used to cause rapid concentration of the block copolymer in the (e.g., cast) film. This rapid solvent removal through capillary action of the supporting substrate is favorable for formation of isopores during the coating process.

The processes introduced here allow for the formation of membranes from materials which are not amenable to SIPS. For example, block copolymer materials that contain a hydrophilic block (such as polyethylene oxide), which as a homopolymer, would be soluble in water, may undergo gelation rather than precipitation and therefore would not form membranes by traditional SIPS methods. However, by forming thin film composites from solvents which can be easily removed through evaporation, precipitation is no longer a necessary step in organizing the membrane structure, and isoporous structures can be formed. The exact mechanism is not known, but coalescence and packing of the block copolymers occurs during one or more of the steps of concentration, (optional) residual solvent washing, or drying, resulting in forming isoporous membrane.

Another situation where this process may be more beneficial than traditional SIPS is on polymer systems which begin gelling at the solution concentrations necessary to form integral membrane materials by SIPS (typically greater than 10 wt %). Processes according to the present disclosure circumvent this issue since they can make use of much lower solution concentrations (less than 7 wt %).

The nature and composition of the solvents which along with the block copolymer make up the (e.g., casting) composition are not particularly critical so long as a mixture of free polymer chains, polymer micelles, and polymer aggregates, wherein the population of polymer free chains is substantially minor, results (e.g., is a dispersion). The solvents can be broadly categorized as neutral, selective and nonsolvent. A neutral solvent for a given block copolymer will dissolve the block copolymer to yield a visibly clear solution of free chains. A selective solvent for a given block copolymer would dissolve a homopolymer of similar molecular weight and composition to at least one of the block copolymer constituent blocks while having limited or no solubility for at least one other block copolymer constituent blocks. Such a selective solvent for a given block copolymer would tend to swell the block copolymer or form a dispersion of micelles and/or aggregates. A nonsolvent for a given block copolymer displays limited solubility for a homopolymer of similar molecular weight and compositions for all the block copolymer constituent blocks. Methods of the present disclosure typically use solvent combinations wherein at least one selective solvent is used. Multiple selective solvents can be combined to form the desired composition (typically a dispersion).

The solvent composition may be modified by judicious choice of neutral, selective, and non-solvents to form the desired composition (e.g., dispersion). For example, Hansen solubility parameters may be used to determine useful solvent compositions. It is recognized that in some cases, non-solvents may be identified as pore-formers or pore-forming agents. It may be advantageous to choose (e.g., casting) solvents that are volatile, such that the process is purely evaporative, eliminating the need for a wash bath to remove residual solvents which have entered the porous substrate by capillary action.

The amount of solvent present is not particularly limited, and may include 65 weight percent (wt %) solvent or greater, 70 wt % solvent or greater, 75 wt % solvent or greater, 80 wt % solvent or greater, or 85 wt % solvent or greater; and 99.9 wt % solvent or less, 99.8 wt % solvent or less, 99.7 wt % solvent or less, 99.6 wt % solvent or less, 99.5 wt % solvent or less, 99 wt % solvent or less, 98.5 wt % solvent or less, 98 wt % solvent or less, 97.5 wt % solvent or less, 97 wt % solvent or less, 96 wt % solvent or less, 95 wt % solvent or less, 90 wt % solvent or less, or 85 wt % solvent or less. The weight percent of solvent is based on the total weight of the solution. Stated another way, the solvent may be present in an amount ranging from 65 to 99.9 wt % of the total solution, inclusive, 65 to 95 wt % of the total solution, inclusive, or 85 to 99.9 wt % of the total solution, inclusive.

Some exemplary solvents for use in the method include dimethylformamide, dimethylacetamide, N-methylpyrrolidone, dimethylsulfoxide, 1,4-dioxane, 1,3-dioxane, tetrahydrothiophene 1,1-dioxide, methyl ethyl ketone, tetrahydrofuran, sulfolane, acetone, hexane, methyl THF, and combinations thereof. In some embodiments, the solvent comprises a blend of N-methylpyrrolidone and methyl ethyl ketone, or a blend of tetrahydrofuran with one of dimethylacetamide, N-methylpyrrolidone, acetone, or dimethylformamide. In certain embodiments, a single solvent is used instead of a combination of two or more solvents.

Since a coating composition suitable for use in the present methods consists of particles dispersed in a liquid, the solid particles will not diffuse through a porous substrate that has pores with a size smaller than the colloid dimensions because of size exclusion mechanism. Additionally, particles smaller than the pore size may not readily diffuse through a pore because of dispersed particles accumulating in and obstructing the pore (e.g., forming a bottle neck), from rapid concentration at the surface of the supporting substrate. In contrast, for a molecular solution of block copolymer chains, the dissolved copolymer molecules will diffuse more easily through the porous membrane. The larger the size of the particle, the larger the pore of the supporting membrane that can be used to cause rapid concentration of the block copolymer particles. Higher concentrations of the dispersed particles also helps with the particles concentrating at the surface of the supporting substrate. This rapid solvent removal through capillary action of the supporting substrate is favorable for formation of isopores during the coating process.

If the pores of the porous substrate are too large or if the (suspended particles) micelles or free chains of triblock copolymer or pentablock copolymer in the composition are too small, the copolymer can permeate the pores of the porous substrate and typically an undesirable conforming coating will form on the surface and pore walls of the support substrate. In some embodiments, the porous substrate comprises pores having a mean pore diameter at a surface of the porous substrate of 500 nm or less, 450 nm or less, 400 nm or less, 350 nm or less, 300 nm or less, 250 nm or less, 200 nm or less, 150 nm or less, or 100 nm or less; and 1 nm or more, 5 nm or more, 10 nm or more, 15 nm or more, 20 nm or more, 25 nm or more, 30 nm or more, 35 nm or more, 40 nm or more, 45 nm or more, 50 nm or more, 55 nm or more, 60 nm or more, 65 nm or more, 70 nm or more, 75 nm or more, 80 nm or more, 85 nm or more, 90 nm or more, or 95 nm or more.

Suitable porous support substrates include for example and without limitation, polymeric membranes, nonwoven substrates, or combinations thereof. Suitable polymeric membranes may be either symmetric or asymmetric, for instance depending on a desired application. In some embodiments, the porous substrate comprises a microfiltration membrane or an ultrafiltration membrane. Porous support substrates can have one layer or be multilayer, plus can be made of different materials throughout their thicknesses. Suitable nonwoven substrates include electrospun substrates, blown microfiber substrates, wetlaid substrates, spunbond substrates, airlaid substrates, and any combination thereof. If desired, the porous support substrate can be calendared to reduce its thickness and pore size. Preferably, the porous substrate is sufficiently hydrophilic that it is water wettable either spontaneously or under subjection to a pressure of 210 kilopascals (kPa) or less, 180 kPa or less, 150 kPa or less, 120 kPa or less, or 90 kPa or less.

In some embodiments, the isoporous membrane is attached to the porous substrate. "Attached" refers to when the solvent partially dissolves the isoporous membrane and the porous substrate and they bond together before resolidifying, in addition to the complex surface entanglement the isoporous membrane and the porous substrate can interact via van der Waals forces, hydrogen bonding, and/or hydrophobic bond interactions, i.e., any interaction short of a covalent bond. Not having to rely on a covalent bond is an advantage. When the isoporous membrane is adhered well to the porous substrate, the isoporous membrane tends to be resistant to peeling, and/or flaking, plus tends to be flexible (e.g., can be bent up to creasing the support substrate with no cracking). In at least certain embodiments, the article has good stability to changes in temperature and pH.

In some embodiments, the isoporous membrane is integral to the porous substrate and a majority of the thickness of the isoporous membrane is located above (or below) a major surface of the porous substrate. A portion of the isoporous membrane is located within the porous substrate when the two are integral. For instance, referring to FIG. 1B, a scanning electron microscopy (SEM) image is provided of a cross-section of the article 1000 of EX 77 (see Examples below). The article 1000 comprises a porous substrate 1100 having an isoporous membrane 1200 having a thickness of approximately 50 nm integrally formed on the porous substrate 1100. Advantageously, articles having an isoporous membrane integrally attached to the porous substrate have increased toughness (e.g., decreased brittleness) than articles in which the isoporous membrane and the porous substrate are not integral with each other.

Typically, the thickness of the isoporous membrane from a major surface of the porous substrate (e.g., not including isoporous membrane that is located within pores of the porous substrate) is 1000 nanometers (nm) or less, 900 nm or less, 800 nm or less, 700 nm or less, 600 nm or less, 500 nm or less, 400 nm or less, 300 nm or less, 200 nm or less, 100 nm or less, 90 nm or less, 80 nm or less, 70 nm or less, 60 nm or less, 50 nm or less, 40 nm or less, or 30 nm or less; and 20 nm or greater, 25 nm or greater, 30 nm or greater, 40 nm or greater, 55 nm or greater, 65 nm or greater, 75 nm or greater, 85 nm or greater, 95 nm or greater, or 105 nm or greater. In certain embodiments, the desired pores of the isoporous membrane have a generally cylindrical shape and a depth of approximately twice the mean pore diameter at a surface of the isoporous membrane.

Process conditions and specific solution formulations can be selected to provide an isoporous membrane in which the pores at one surface (or both major surfaces) of the membrane have an average pore size of 1 nanometer (nm) or greater, 5 nm or greater, 10 nm or greater, 20 nm or greater, 30 nm or greater, or 40 nm or greater; and 500 nm or less, 450 nm or less, 400 nm or less, 350 nm or less, 300 nm or less, 250 nm or less, 200 nm or less, or 150 nm or less. Stated another way; the surface pores (e.g., pores located on at least one membrane surface) may have an average pore size ranging from 1 nm to 500 nm, inclusive, or from 5 nm to 50 nm, inclusive. Further, an isoporous membrane may have a pore density of $1 \times 10^{14}$ pores per square meter or greater.

For an isoporous membrane, in some embodiments a standard deviation in pore diameter at a surface of the membrane (e.g., surface pore diameter) is 4 nanometers (nm) or less from a mean pore diameter at the surface of the membrane when the mean pore diameter at the surface of the membrane ranges from 5 to 15 nm, the standard deviation in pore diameter at the surface of the membrane is 6 nm or less from the mean pore diameter at the surface of the membrane when the mean pore diameter at the surface of the membrane ranges from greater than 15 to 25 nm, and the standard deviation in pore diameter at the surface of the membrane is 25% or less of the mean pore diameter at the surface of the membrane when the mean pore diameter at a surface of the membrane ranges from greater than 25 to 50 nm. The desired pores are generally circular or elliptical, and the mean pore size is determined using an idealized circular shape to measure a diameter when analyzing pores from a scanning electron microscopy image or an atomic force microscopy image. The mean surface pore diameter is the average diameter of the pores at a surface of the membrane, although it is possible that pores within the body of the membrane have the same average diameter.

Preferably, isoporous membranes according to the present disclosure are spontaneously water wettable (e.g., hydrophilic). As used herein, the term "wettable" refers to spontaneous absorption of water or solvent by the material, not merely passage of a water or solvent through pores of the material with the application of pressure.

Suitable triblock copolymers typically comprise an ABC block copolymer or an ACB block copolymer, wherein suitable pentablock copolymers typically comprise an ABCBA block copolymer or an ACBCA block copolymer. The A, B, and C blocks are as described in detail below:

The "B" block of the copolymer comprises polymeric units that form hard, glassy domains upon polymerization, with the B block having a $T_g$ of at least 50° C., preferably at least 70° C., and more preferably at least 90° C. $T_g$ can be determined using differential scanning calorimetry. The B block polymer domain comprises a total of 30 to 80 weight percent of the block copolymer.

The hard B blocks are typically selected from vinyl aromatic monomers and include, for example, styrene, α-methylstyrene, para-methylstyrene, 4-methylstyrene, 3-methylstyrene, 4-ethylstyrene, 3,4-dimethylstyrene, 2,4,6-trimethylstyrene, 3-tert-butyl-styrene, 4-tert-butylstyrene, 4-methoxystyrene, 4-trimethylsilylstyrene, 2,6-dichlorostyrene, vinyl naphthalene, and vinyl anthracene.

In some embodiments, the B block comprises a polyalkylmethacrylate. Exemplary B blocks include for instance and without limitation, styrene, p-methylstyrene, alpha-methylstyrene, poly(tert-butylstyrene), and polymethylmethacrylate.

The nature and composition of the monomers which make up the individual C block is not particularly critical so long as the polymerized monomers provide a phase which meets the glass temperature requirement and, thus, can be described as "amorphous," "soft" or "rubbery." These terms are used interchangeably throughout the specification. It will be understood that "amorphous" blocks contain no or negligible amounts of crystallinity.

In particular embodiments, each block C is independently selected from the group consisting of polymerized (i) conjugated diene monomers, or (ii) a silicon polymer, and (iii) mixtures of monomers wherein segments containing polymerized conjugated diene monomers are optionally hydrogenated. Suitable conjugated dienes include, e.g., butadiene, isoprene, and the like, as well as 1,3-cyclodiene monomers, such as 1,3-cyclohexadiene, 1,3-cycloheptadiene and 1,3-cyclooctadiene, preferably 1,3-cyclohexadiene. When the C blocks of conjugated acyclic dienes such as butadiene or mixtures thereof are optionally hydrogenated, such blocks should have a vinyl content of from 0 to 40 mole percent post hydrogenation. C blocks resulting from hydrogenation include, but are not limited to, poly(ethylene-alt-propylene), poly(butylene), poly(ethylene-co-butylene), and poly(ethylene-co-propylene-co-butylene).

Additionally, the C blocks may be polymer blocks of silicon rubber segments, i.e., blocks of organopolysiloxanes having recurring units of —[Si($R^{10}$)$_2$—O]— wherein each $R^{10}$ denotes an organic radical, e.g., alkyl, cycloalkyl or aryl. Such blocks of organopolysiloxanes may be prepared by anionic polymerization of cyclic siloxanes of the general formula —[Si($R^{10}$)$_2$—O]$_r$—, where subscript r is 3 to 7. Cyclic siloxanes where subscript r is 3 or 4, and $R^{10}$ is methyl are preferred. Anionic polymerization of hexamethylcyclotrisiloxane monomer is generally described in Y. Yamashita et al. (for example, in Polymer J. 14, 913 (1982); ACS Polymer Preprints 25 (1), 245 (1984): Makromol. Chem. 185, 9 (1984)).

In some embodiments, the C block comprises a polyacrylate or a polysiloxane. Exemplary C blocks include for instance and without limitation, polyisoprene, polybutadiene, polyisobutylene, polydimethylsiloxane, polyethylene, poly(ethylene-alt-propylene), poly(ethylene-co-butylene-co-propylene), polybutylene, and poly(ethylene-stat-butylene).

The "C" block of the copolymer is substantially free of functional groups. Additionally, each of such blocks C may have a number average molecular weight of from about 1,000 to 200,000 and may have a glass transition temperature, $T_g$, of ≤20° C., preferably ≤0° C. The soft "C" block comprises a total of 10 to 40 weight percent of the pentablock block polymer. The combined B and C blocks comprise 70 to 95 weight percent of the pentablock polymeric units The A blocks comprise a copolymer block immiscible in the B and C blocks. The immiscible component of the copolymer shows multiple amorphous phases as determined, for example, by the presence of multiple amorphous glass transition temperatures using differential scanning calorimetry or dynamic mechanical analysis. As used herein, "immiscibility" refers to polymer components with limited solubility and non-zero interfacial tension, that is, a blend whose free energy of mixing is greater than zero:

$$\Delta G \cong \Delta H_m \text{ greater than } 0$$

Miscibility of polymers is determined by both thermodynamic and kinetic considerations. Common miscibility predictors for non-polar polymers are differences in solubility parameters or Flory-Huggins interaction parameters. For polymers with non-specific interactions, such as polyolefins, the Flory-Huggins interaction parameter can be calculated by multiplying the square of the solubility parameter difference with the factor (V/RT), where V is the molar volume of the amorphous phase of the repeated unit, R is the gas constant, and T is the absolute temperature. As a result, the Flory-Huggins interaction parameter between two non-polar polymers is always a positive number.

In certain embodiments, the A block comprises a poly(alkylene oxide), a polymerized substituted epoxide, a polylactam, a substituted polycarbonate, or a polymerized diene block hydrophilized through post-polymerization modification. Exemplary A blocks include for instance and without limitation, poly(D-lactide), poly(L-lactide), poly(D/L-lactide), polyethyleneoxide, poly(propylene oxide), poly(ethyloxyethylglycidylether), poly(4-vinylpyridine), poly(2-vinylpyridine), polyhydroxystyrene, polyacrylamide, polyacrylic acid, poly(methacrylic acid), polydimethylacrylamide, poly(N-isopropylacrylamide), polyhydroxyethylmethacrylate, poly-ε-caprolactone, and poly(propylenecarbonate). Examples of hydrophilized poly(diene) segments generally consist of hydrosilylated block wherein the silane used contains hydrophilic constituents such as poly(ethyleneoxide) and oligomeric ethylene oxide.

In certain embodiments the A blocks are derived from ring-opening anionic polymerization of cyclic monomers or dimers selected from oxiranes (epoxides) to produce polyethers, cyclic sulfides to produce polythioethers, lactones and lactides to produce polyesters, cyclic carbonates to produce polycarbonates, lactams to produce polyamides and aziridines to produce polyamines. Polycarbonates may also be prepared by metal-catalyzed polymerization of carbon dioxide with epoxides listed previously (as described in Journal of the American Chemical Society, 2005, pg. 10869).

Useful epoxides include $C_2$-$C_{10}$, preferably $C_2$-$C_4$ alkyl epoxides. In particular ethylethoxy-glycidyl ether, ethylene, propylene, and butylene oxides.

Suitable lactones and lactams are those having 3 to 12 carbon atoms in the main ring and are of the general formula:

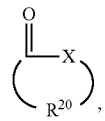

wherein $R^{20}$ is an alkylene moiety that may be linear or branched having 1 to 20 carbon atoms, preferably 1 to 12 carbon atoms optionally substituted by catenary (in-chain) oxygen atoms, carbonyls or carboxylates; and X is —O— or $NR^1$—, where $R^1$ is $C_1$-$C_4$ alkyl. It will be appreciated that the cyclic lactones are derived from hydroxy acids including 3-hydroxy butyrate, 4-hydroxybutyrate, 3-hydroxyvalerate, lactic acid, 3-hydroxypropanoate, 4-hydropentanoate, 3-hydroxypentanoate, 3-hydroxyhexanoate, 3-hydroxyheptanoate, 3-hydroxyoctanoate, dioxanone, valerolactone, caprolactone, and glycolic acid. The lactams are derived from the corresponding aminoacids. Dimers of the hydroxy acids, such as lactide may be used.

Useful lactams include 2-pyrrolidone, 2-piperidone, caprolactam, lauryllactam and mixtures thereof.

Useful cyclic carbonates include 5-membered to 7-membered cyclic carbonates. In embodiments, cyclic components comprise trimethylene carbonate, neopentyl glycol carbonate, 2,2,4-trimethyl-1,3-pentanediol carbonate, 2,2-dimethyl-1,3-butanediol carbonate, 1,3-butanediol carbonate, 2-methyl-1,3-propanediol carbonate, 2,4-pentanediol carbonate, 2-methyl-butane-1,3-diol carbonate, ethylene carbonate, and propylene carbonate.

Suitable cyclic anhydrides include, but are not limited to, aliphatic dicarboxylic anhydrides, such as, succinic anhydride, glutaric anhydride, maleic anhydride and combinations thereof.

Example of aziridine monomers comprise aziridine and its alkyl-substituted homologues.

Suitable cyclic ethers include 5-membered to 7-membered cyclic ethers.

Reference to suitable ring-opening polymerizable monomers may be found in Frisch, Kurt Charles; Reegan, Sidney L; Ring-opening polymerization: Kinetics and mechanisms of polymerization, Dekker Publishing, NY: 1969 and in Su, Wei-Fang, Ring-Opening Polymerization in Principles of Polymer Design and Synthesis: Springer Berlin Heidelberg, pp. 267-299, 2013.

Suitable triblock or pentablock copolymers can be obtained or produced by any appropriate method well known in the art for the synthesis of block copolymers. Methods known in the art suitable for synthesizing block copolymers that can be used alone or in combination to synthesize the triblock or pentablock copolymers described herein include sequential anionic polymerization, ring opening polymerization, anionic ring opening polymerization, ring opening metathesis polymerization (ROMP), and controlled radical polymerizations methods such as atom transfer radical polymerization (ATRP), reversible addition/fragmentation chain transfer polymerization (RAFT), and nitroxide-mediated polymerization (NMP).

In some embodiments, sequential anionic polymerization is used to prepare the triblock or pentablock copolymers. In some embodiments, sequential anionic polymerization and anionic ring opening polymerization are used to prepare the triblock or pentablock copolymers.

Anionic polymerizations and copolymerizations include one or more polymerization initiators. Carbon-centered propagating anions will often require differing initiators from those used to produce oxygen-centered propagating anions.

Suitable initiators include alkali metal hydrocarbons such as alkyl or aryl lithium, sodium, or potassium compounds containing up to 20 carbon atoms in the alkyl or aryl radical or more, preferably up to 8 carbon atoms. Examples of such compounds are benzylsodium, ethylsodium, propylsodium, phenylsodium, butylpotassium, octylpotassium, benzylpotassium, benzyllithium, methyllithium, ethyllithium, n-butyllithium, sec-butyllithium, tert-butyllithium, phenyllithium, and 2-ethylhexyllithium. Lithium compounds are preferred as initiators.

Initiators particularly useful with specific monomers are well known in the art. Initiators compatible with the exemplary monomer systems discussed herein are summarized in Hsich et al., Anionic Polymerization: Principles and Practical Applications, Ch. 5, and 23 (Marcel Dekker, New York, 1996).

Examples include, for example, alkyl lithium compounds such as s-butyllithium, n-butyllithium, tert-butyllithium, amyllithium and the like and other organo lithium compounds including di-initiators such as the di-sec-butyllithium adduct of m-diisopropenyl benzene and the tert-butyllithium adduct of 1-bis(phenyl)vinylbenzene. Further suitable di-initiators are disclosed in U.S. Pat. No. 6,492,469. Of the various polymerization initiators, s-butyllithium is preferred. The initiator can be used in the polymerization mixture (including monomers and solvent) in an amount calculated on the basis of one initiator molecule per desired polymer chain. The lithium initiator process is well known and is described in, for example, U.S. Pat. No. 4,039,593 and Re. 27,145.

Molecular weight is determined by the initiator/monomer ratio, and thus the amount of initiator may vary from about 0.0001 to about 0.2 mole of organometallic initiator per mole of monomer. Preferably, the amount will be from about 0.002 to about 0.04 mole of initiator per mole of monomer. For the initiation of carbon-centered anionic polymerization, an inert preferably nonpolar organic solvent can be utilized. Anionic polymerization of cyclic monomers that yield an oxygen-centered anion and lithium cation require either a strong polar solvent such as tetrahydrofuran, dimethyl sulfoxide, or hexamethylphosphorous triamide, or a mixture of such polar solvent with nonpolar aliphatic, cycloaliphatic, or aromatic hydrocarbon solvent such as hexane, heptane, octane, cyclohexane, or toluene.

In one embodiment, the polymerization of monomers into the triblock polymer is initiated via addition of divalent anionic initiators that are known in the art as useful in the copolymerization of diene monomers and vinyl aromatic hydrocarbons. Such initiators can be selected from organic compounds comprising 2 lithium groups as represented by the formula as shown below:

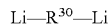

Li—$R^{30}$—Li wherein $R^{30}$ is a divalent hydrocarbon group. $R^{30}$ generally contains 4 to 30 carbon atoms per $R^{30}$ group. Useful difunctional initiators are described in U.S. Pat. No. 7,884, 160 (Wang et al.), and U.S. Pat. No. 5,750,055 (Van Der Steen et. al), incorporated herein by reference.

Other bi-functional anionic initiators include, but are not limited to, 1,4-dilithiobutane, 1,5-dilithiopentane, 1,10-dilithiodecane, 1,20-dilithiocicosane, 1,4-dilithiobenzene, 1,4-dilithionaphthalene, 1,10-dilithioanthracene, 1,2-dilithio-1, 2-diphenylethane, and the like, and mixtures thereof.

Generally; the polymerization can be carried out at a temperature ranging from about −78° C. to about 100° C., preferably from about 0° C. to about 60° C. Anhydrous conditions and an inert atmosphere such as nitrogen, helium, or argon are typically required. Termination of the anionic polymerization is, in general, achieved via direct reaction of the living polymeric anion with protic solvents. Termination with halogen-containing terminating agents, i.e., functionalized chlorosilanes, can produce, for example, vinyl-terminated polymeric monomers. Such terminating agents may be represented by the general formula X—$(Y)_n$—Si$(R)_{3-m}$Cl$_m$, where m is 1, 2, or 3 and where X, Y, n, and R have been previously defined. Preferred terminating agents are chlorotrimethylsilane or methacryloxypropyldimethylchlorosilane. The termination reaction is carried out by adding a slight molar excess of the terminating agent (relative to the amount of initiator) to the living polymer at the polymerization temperature.

It is recognized that transitioning from a carbon-centered propagating anion to an oxygen-centered propagating anion can be used as a method for terminating an anionic polymerization of vinyl aromatics or conjugated dienes. For example, addition of oxiranes like ethylene oxide to the styrenic anion produced during styrene polymerization can lead to end-capping of the polymer chain with a hydroxyl, oxygen-centered anionic functionality. The reduced nucleophilicity of the oxygen-centered anion prevents further polymerization of any vinyl aromatic or conjugated diene present, thus ethylene oxide acts as a terminating agent in one sense, yet also forms an initiator for further ring-opening polymerizations (as in Hsieh et al., Anionic Polymerization: Principles and Practical Applications, Ch. 5, and 23 (Marcel Dekker, New York, 1996)).

Functional anionic initiators can also be used to provide end-functionalized polymers. These initiators are typically suitable for initiating the recited monomers using techniques known to those skilled in the art. Various functional groups can be incorporated onto the end of a polymer chain using this strategy including: alcohol(s), thiol(s), carboxylic acid, and amine(s). In each of these cases, the initiator must contain protected functional groups that can be removed using post polymerization techniques. Suitable functional initiators are known in the art and are described in, e.g., U.S. Pat. No. 6,197,891 (Schwindeman et al.); U.S. Pat. No. 6,160,054 (Periera et al.); U.S. Pat. No. 6,221,991 (Letchford et al.); U.S. Pat. No. 6,184,338 (Schwindeman et al.); and U.S. Pat. No. 5,321,148 (Schwindeman et al.); each incorporated herein by reference.

These initiators contain tertiary alkyl or trialkylsilyl protecting groups that can be removed by post polymerization deprotection. Tert-alkyl-protected groups can also be removed by reaction of the polymer with para-toluenesulfonic acid, trifluoroacetic acid, or trimethylsilyliodide to produce alcohol, amino, or thiol functionalities. Additional methods of deprotection of the tert-alkyl protecting groups can be found in T. W. Greene and P. G. M. Wuts, Protective Groups in Organic Synthesis, Second Edition, Wiley, New York, 1991, page 41. Tert-butyldimethylsilyl protecting groups can be removed by treatment of the polymer with acid, such as hydrochloric acid, acetic acid, para-toluenesulfonic acid. Alternatively, a source of fluoride ions, for instance tetra-n-butylammonium fluoride, potassium fluoride and 18-crown-6, or pyridine-hydrofluoric acid complex, can be employed for deprotection of the tert-butyldimethylsilyl protecting groups. Additional methods of deprotection of the tert-butyldimethylsilyl protecting groups can be found in T. W. Greene and P. G. M. Wuts, Protective Groups in Organic Synthesis, Second Edition, Wiley, New York, 1991, pages 80-83.

One suitable method of preparing a pentablock copolymer comprises the steps of a) anionically polymerizing, with a functional initiator, the B block monomer (such as styrene), b) polymerizing the C block monomer, (such as isoprene), c) coupling the block copolymer formed in steps a) and b) with a coupling agent, deprotecting, and further polymerizing the coupled polymer of step c) with a ring-opening polymerizable monomer (such as ethylene oxide).

In this method the ends of the RO—BC—Li block copolymer is coupled to generate a RO—CBC—OR block copolymer with a coupling agent such that substantially each polymer chain has a residue of an initiator present on substantially each polymer chain end. The coupling agent is present in a minor proportion of the CBC polymer chain backbone. Suitable coupling agents include, in solution, dihalogenated compounds; diacid chlorides; diacid bromides; dichloro compounds; dibromosilanes and dichlorosilanes, and the di-functional compounds: bis-epoxides, bis-aziridines, bis-isocyanates, bis-anhydrides and diesters. Preferred coupling agents include terephthaloyl chloride, dichlorodimethylsilane, dichlorodiphenylsilane, 1,4-dibromobutene, α,α'-dibromoxylene, and m-bis(phenylethenyl) benzene (PEB).

The method may be illustrated as follows with styrene as the "B" monomer, isoprene as the "C" monomer, and a functional initiator. Styrene is anionically polymerized followed by isoprene to yield an RO—BC—Li block copolymer intermediate having a carbon-centered lithium anion on one terminus and the residue of the functional initiator having a protected functional group on the other terminus. For example, if the functional initiator was t-butyldimethylsilylpropyl lithium (TBDMSPL), the residue is t-butyldimethylsilylpropyl. The intermediate is reacted with a coupling agents, such as α,α'-dibromoxylene, to produce an intermediate having the protected functional group on both termini. This intermediate may be deprotected, such as by reaction with fluoride ion. Using the TBDMSPL initiator, deprotection yields a hydroxyl group at the copolymer termini. This hydroxyl-functional copolymer may be reacted with the A monomer via ring-opening polymerization to provide the A blocks.

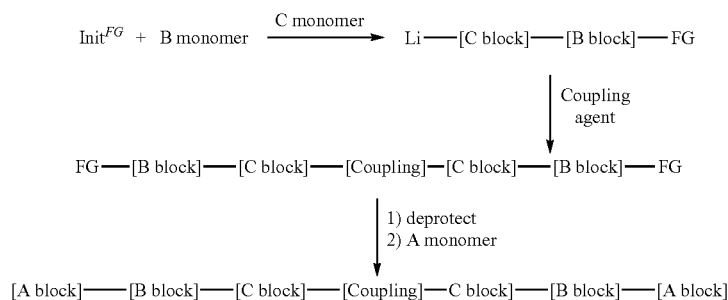

In another embodiment the functional initiator may be reacted with the B monomers, followed by the C monomers to produce the same Li-[C block]-[B block]-FG intermediate supra. This intermediate may then be reacted with a second quantity of B monomers, followed by a quantity of ethylene oxide or other oxirane, to monofunctionalize a terminus of the block copolymer to yield the intermediate shown. Deprotection of the functional group yields a difunctional, telechelic block copolymer, which may be reacted with additional A monomer to yield the pentablock copolymer.

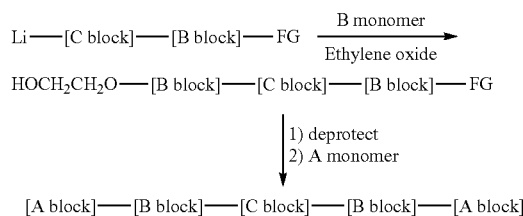

In another embodiment the anionic polymerization can be initiated with a difunctional initiator, reacted with the C monomers, the B monomers and the A monomers to yield the pentablock copolymer.

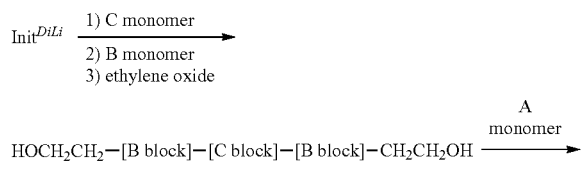

One suitable method of preparing a triblock copolymer comprises the steps of a) anionically polymerizing, with a functional initiator, the B block monomer (such as styrene), b) polymerizing the C block monomer, (such as isoprene), c) terminating the block copolymer formed in steps a) and b) with a terminating agent, deprotecting, and further polymerizing the polymer of step c) with a ring-opening polymerizable monomer (such as ethylene oxide).

In another embodiment a lithium initiator may be reacted with the C monomers, followed by the B monomers to produce a Li-[B block]-[C block] intermediate. This intermediate may then be reacted with a quantity of ethylene oxide or other oxirane, to monofunctionalize a terminus of the block copolymer to yield a monohydroxyl HO-[B block]-[C block] intermediate, which may be reacted with additional A monomer to yield the triblock copolymer.

In another embodiment the anionic polymerization can be initiated with an initiator, reacted with the C monomers, the B monomers and the A monomers to yield the triblock copolymer.

With each of the synthetic schemes it will be understood that some amount of A, B, C, BC, BCB, or ABC (co) polymers will also be present in the isolated (co)polymer blend. Generally greater than 50 wt % of the resulting blend will be the intended triblock or pentablock copolymer, as determined by GPC and/or NMR.

Further to a block copolymer, the porous membrane may also contain at least one additive, such as for instance and without limitation, a homopolymer, a diblock copolymer, a triblock copolymer, and combinations thereof. These additives are not a majority component in the membrane, but are rather present in an amount ranging from 1 weight percent to 49 weight percent of the total weight of the membrane, inclusive.

In some embodiments, a preferably weight ratio of the B block to the C block ranges from 2.3:1 B block to C block to 1.7:1 B block to C block, for instance about 2:1 B block to C block.

In some embodiments, the C block comprises a weight average molecular weight of 6,000 grams per mole (g/mol) or greater, 8,000 g/mol or greater, 10,000 g/mol or greater, 15,000 g/mol or greater, 20,000 g/mol or greater, 30,000 g/mol or greater, 40,000 g/mol or greater, 50,000 g/mol or greater, 60,000 g/mol or greater, 70,000 g/mol or greater, 80,000 g/mol or greater, or 100,000 g/mol or greater; and 200,000 g/mol or less, 190,000 g/mol or less, 180,000 g/mol or less, 170,000 g/mol or less, 160,000 g/mol or less, 150,000 g/mol or less, 140,000 g/mol or less, 130,000 g/mol or less, 120,000 g/mol or less, or 110,000 g/mol or less. Stated another way, the C block optionally comprises a weight average molecular weight ranging from 6,000 to 200,000 g/mol, inclusive, such as ranging from 60,000 to 200,000 g/mol, inclusive.

In select embodiments, the block copolymer comprises a dispersity ranging from 1.0 to 5.0, 1.0 to 4.0, 1.0 to 3.0, or 1.0 to 2.0, each range being inclusive.

In some embodiments, the isoporous membrane is located within the porous substrate. The porous substrate could be embossed prior to coating. For instance, pores of the porous substrate may be filled with a composition comprising a solvent and solids comprising a triblock copolymer or a pentablock copolymer to form a film within the porous structure of the porous substrate. Wicking (and optionally also evaporation) of the solvent removes at least a portion of the solvent from the composition film and forms an isoporous membrane located within the porous substrate.

Embodiments

In a first embodiment, the present disclosure provides an article. The article comprises an isoporous membrane disposed on a porous substrate. The isoporous membrane comprises a triblock copolymer or a pentablock copolymer. The isoporous membrane has a thickness and is isoporous throughout the thickness.

In a second embodiment, the present disclosure provides an article according to the first embodiment, wherein the thickness of the isoporous membrane from a major surface of the porous substrate is 1000 nanometers (nm) or less, 900 nm or less, 800 nm or less, 700 nm or less, 600 nm or less, 500 nm or less, 400 nm or less, 300 nm or less, 200 nm or less, 100 nm or less, 90 nm or less, 80 nm or less, 70 nm or less, 60 nm or less, 50 nm or less, 40 nm or less, or 30 nm or less; and 20 nm or greater, 25 nm or greater, 30 nm or greater, 40 nm or greater, 55 nm or greater, 65 nm or greater, 75 nm or greater, 85 nm or greater, 95 nm or greater, or 105 nm or greater.

In a third embodiment, the present disclosure provides an article according to the first embodiment, wherein the isoporous membrane is located within the porous substrate.

In a fourth embodiment, the present disclosure provides an article according to any of the first to third embodiments, wherein the triblock copolymer or the pentablock copolymer comprises an A block comprising a poly(alkylene oxide), a polymerized substituted epoxide, a polylactam, or a substituted polycarbonate.

In a fifth embodiment, the present disclosure provides an article according to any of the first to third embodiments, wherein the triblock copolymer or the pentablock copolymer comprises an A block selected from the group consisting of poly(D-lactide), poly(L-lactide), poly(D/L-lactide), polyethyleneoxide, poly(propylene oxide), poly(ethyloxyethylglycidylether), poly(4-vinylpyridine), poly(2-vinylpyridine), polyhydroxystyrene, polyacrylamide, polyacrylic acid, poly(methacrylic acid), polydimethylacrylamide, poly(N-isopropylacrylamide), polyhydroxyethylmethacrylate, poly-e-caprolactone, and poly(propylenecarbonate).

In a sixth embodiment, the present disclosure provides an article according to any of the first to fifth embodiments, wherein the triblock copolymer or the pentablock copolymer comprises a B block comprising a polyalkylmethacrylate.

In a seventh embodiment, the present disclosure provides an article according to any of the first to fifth embodiments, wherein the triblock copolymer or the pentablock copolymer comprises a B block selected from the group consisting of styrene, p-methylstyrene, alpha-methylstyrene, poly(tert-butylstyrene), and polymethylmethacrylate.

In an eighth embodiment, the present disclosure provides an article according to any of the first to seventh embodiments, wherein the triblock copolymer or the pentablock copolymer comprises a C block comprising a polyacrylate or a polysiloxane.

In a ninth embodiment, the present disclosure provides an article according to any of the first to seventh embodiments, wherein the triblock copolymer or the pentablock copolymer comprises a C block selected from the group consisting of polyisoprene, polybutadiene, polyisobutylene, polydimethylsiloxane, polyethylene, poly(ethylene-alt-propylene), poly(ethylene-co-butylene-co-propylene), polybutylene, and poly(ethylene-stat-butylene).

In a tenth embodiment, the present disclosure provides an article according to the eighth or ninth embodiments, wherein the C block has a weight average molecular weight ranging from 6,000 to 200,000 grams per mole, inclusive.

In an eleventh embodiment, the present disclosure provides an article according to any of the sixth to tenth embodiments, wherein a weight ratio of the B block to the C block ranges from 2.3:1 to 1.7:1.

In a twelfth embodiment, the present disclosure provides an article according to any of the fourth to eleventh embodiments, wherein the triblock copolymer comprises an ABC or ACB block copolymer.

In a thirteenth embodiment, the present disclosure provides an article according to any of the fourth to eleventh embodiments, wherein the pentablock copolymer comprises an ABCBA or an ACBCA block copolymer.

In a fourteenth embodiment, the present disclosure provides an article according to any of the first to thirteenth embodiments, wherein the isoporous membrane is attached to the porous substrate.

In a fifteenth embodiment, the present disclosure provides an article according to any of the first to fourteenth embodiments, wherein the porous substrate comprises pores having a mean pore diameter at a surface of the porous substrate of 500 nm or less to 1 nm or more.

In a sixteenth embodiment, the present disclosure provides an article according to any of the first to fifteenth embodiments, wherein the porous substrate comprises a membrane, a nonwoven substrate, or combinations thereof.

In a seventeenth embodiment, the present disclosure provides an article according to the sixteenth embodiment, wherein the porous substrate membrane is a microfiltration membrane or an ultrafiltration membrane.

In an eighteenth embodiment, the present disclosure provides an article according to any of the first to seventeenth embodiments, wherein a standard deviation in pore diameter at a surface of the isoporous membrane is 4 nm or less from a mean pore diameter at the surface of the isoporous membrane when the mean pore diameter at the surface of the isoporous membrane ranges from 5 to 15 nm, the standard deviation in pore diameter at the surface of the isoporous membrane is 6 nm or less from the mean pore diameter at the surface of the isoporous membrane when the mean pore diameter at the surface of the isoporous membrane ranges from greater than 15 to 25 nm, and the standard deviation in pore diameter at the surface of the isoporous membrane is 25% or less of the mean pore diameter at the surface of the isoporous membrane when the mean pore diameter at the surface of the isoporous membrane ranges from greater than 25 to 50 nm.

In a nineteenth embodiment, the present disclosure provides an article according to any of the first to seventeenth embodiments, wherein a portion of the isoporous membrane is integral with a major surface of the porous substrate.

In a twentieth embodiment, the present disclosure provides an article according to any of the first to nineteenth embodiments, wherein the isoporous membrane is spontaneously water wettable.

In a twenty-first embodiment, the present disclosure provides an article according to any of the first to twentieth embodiments, wherein the porous substrate is water wettable either spontaneously or under subjection to a pressure of 210 kilopascals or less.

In a twenty-second embodiment, the present disclosure provides a method of making an article according to any of the first through twenty-first embodiments. The method comprises depositing a composition on a porous substrate, thereby forming a film, and removing at least a portion of the solvent from the film, thereby forming an isoporous membrane comprising a plurality of pores. The composition comprises a solvent and solids comprising a triblock copolymer or a pentablock copolymer. The isoporous membrane has a thickness and is isoporous throughout the thickness of the isoporous membrane.

In a twenty-third embodiment, the present disclosure provides a method of making an article according to the twenty-second embodiment, wherein the removing comprises wicking and optionally evaporation of at least a portion of the solvent for a time of 1 second or greater, 5 seconds or greater, 10 seconds or greater, 15 seconds or greater, 20 seconds or greater, 25 seconds or greater, or 30 seconds or greater; and for a time of 600 seconds or less, 500 seconds or less, 400 seconds or less, 300 seconds or less, 200 seconds or less, 100 seconds or less, 80 seconds or less, 60 seconds or less, 50 seconds or less, or 40 seconds or less.

In a twenty-fourth embodiment, the present disclosure provides a method of making an article according to the twenty-second embodiment or the twenty-third embodiment, wherein the solvent is selected from the group consisting of dimethylformamide, dimethylacetamide, N-methylpyrrolidone, dimethylsulfoxide, 1,4-dioxane, 1,3-dioxane, tetrahydrothiophene 1,1-dioxide, methyl ethyl ketone, tetrahydrofuran, sulfolane, acetone, hexane, methyl THF, and combinations thereof.

In a twenty-fifth embodiment, the present disclosure provides a method of making an article according to the twenty-second embodiment or the twenty-third embodiment, wherein the solvent comprises a pore former.

In a twenty-sixth embodiment, the present disclosure provides a method of making an article according to any of the twenty-second to twenty-fifth embodiments, wherein at least a portion of the solids in the composition are present in a form of micelles or aggregates of micelles.

In a twenty-seventh embodiment, the present disclosure provides a method of making an article according to any of the twenty-second, twenty-third, or twenty-sixth embodiments, comprising a single solvent.

In a twenty-eighth embodiment, the present disclosure provides a method of making an article according to any of the twenty-second to twenty-sixth embodiments, wherein the solvent comprises a blend of N-methylpyrrolidone and methyl ethyl ketone, or a blend of tetrahydrofuran with one of dimethylacetamide, N-methylpyrrolidone, acetone, or dimethylformamide.

In a twenty-ninth embodiment, the present disclosure provides a method of making an article according to any of the twenty-second to twenty-eighth embodiments, wherein the removing comprises wicking of the solvent into the porous substrate.

In a thirtieth embodiment, the present disclosure provides a method of making an article according to any of the twenty-second to twenty-ninth embodiments, wherein the solids are present in an amount of 0.5 weight percent (wt %) or greater of the total composition, 1.0 wt % or greater, 1.5 wt % or greater, or 2.0 wt % or greater; and 7 wt % or less, 6 wt % or less, 5 wt % or less, 4 wt % or less, or 3 wt % or less of the total composition.

In a thirty-first embodiment, the present disclosure provides a method of making an article according to any of the twenty-second to thirtieth embodiments, wherein the composition is cast using a bar gap height of 1 micrometer or greater, 12.5 micrometers or greater, 15 micrometers or greater, 25 micrometers or greater, 35 micrometers or greater, 50 micrometers or greater, or 60 micrometers or greater; and using a bar gap height of 100 micrometers or less, 88 micrometers or less, 75 micrometers or less, or 65 micrometers or less.

In a thirty-second embodiment, the present disclosure provides a method of making an article according to any of the twenty-second to thirty-first embodiments, further comprising washing the isoporous membrane and porous substrate to remove remaining solvent.

In a thirty-third embodiment, the present disclosure provides a method of making an article according to any of the twenty-second to thirty-second embodiments, wherein the pores of the isoporous membrane comprise a mean pore diameter at a surface of the isoporous membrane ranging from 1 nanometer (nm) to 500 nm, inclusive.

EXAMPLES

Membrane Preparation

Chemicals used in polymer synthesis and membrane preparation are summarized in Table 1.

TABLE 1

| Chemical Name (Abbreviation) | Description | Product Code or Trade Designation | Source |
|---|---|---|---|
| N,N-Dimethylacetamide (DMAc) | Solvent | A10924 | Alfa Aesar, Ward Hill, MA |
| Dimethyl formamide (DMF) | Solvent | 22915 | Alfa Aesar, Ward Hill, MA |
| Methyl ethyl ketone (MEK) | Solvent | BK1670-3 | EMD Millipore Corp., Billerica, MA |

TABLE 1-continued

| Chemical Name (Abbreviation) | Description | Product Code or Trade Designation | Source |
|---|---|---|---|
| N-Methyl Pyrrolidone or 1-Methyl-2-pyrrolidinone (NMP) | Solvent | 43894 | Alfa Aesar, Ward Hill, MA |
| Tetrahydrofuran (THF) | Solvent | TX0282-1 | EMD Millipore Corp., Billerica, MA |
| Acetone (Actn) | Solvent | AX0116-1 | EMD Millipore Corp., Billerica, MA |
| Sulfolane (Sulf) | Solvent | A13466 | Alfa Aesar, Ward Hill, MA |
| 2-Methyltetrahydrofuran (MeTHF) | Solvent | 673277 | Sigma-Aldrich Co. LLC., St. Louis, MO |
| Diethylene glycol dimethyl ether (diglyme or dg) | Solvent | 4829 | GFS Chemicals, Columbus, OH |
| 1,4-dioxane (dioxane or dx) | Solvent | 123-91-1 | Sigma-Aldrich Co. LLC., St. Louis, MO |
| Di-n-butylmagnesium | 1.0M in Heptane | 345113 | Sigma Aldrich Co. LLC., St. Louis, MO |
| Karstedt's Catalyst | Platinum-divinyl(tetramethyl)siloxane complex, 2% Pt in xylene | — | Gelest Inc., Morrisville, PA. |
| Isoprene | Monomer | L14619 | Alfa Aesar., Ward Hill, MA. |
| Styrene | Reagent plus, greater than 99% | S4972 | Sigma-Aldrich Co. LLC., St. Louis, MO |
| 4-vinylpyridine (4-VP) | Stabilized, 95% | — | Sigma-Aldrich Co. LLC., St. Louis, MO |
| Butadiene | 1,3-butadiene, greater than 99%, product #295035 | — | Sigma-Aldrich Co. LLC., St. Louis, MO |
| Ethylene Oxide | greater than or equal to 99.5% | 387614 | Sigma-Aldrich Co. LLC., St. Louis, MO. |
| Propylene Oxide | REAGENTPLUS, greater than 99% | — | Sigma-Aldrich Co. LLC., St. Louis, MO |
| Verkade's Base | 2,8,9-Triisopropyl-2,5,8,9-tetraaza-1-phosphabicyclo[3,3,3]undecane | — | Sigma-Aldrich Co. LLC., St. Louis, MO |
| Tri-iso-butylaluminum | 1.0M in hexanes | — | Sigma-Aldrich Co. LLC., St. Louis, MO |
| Sec-butyllithium (Sec-BuLi) | 12 wt % sBuLi in cyclohexane, | 718-01 | FMC Lithium, Charlotte, NC |
| n-butyllithium | 24 wt % n-butyllithium in hexanes | 703-02 | FMC Lithium, Charlotte, NC |
| TBDMSPL | Tert-butyl-dimethylsiloxy-propyl-1-lithium, 1.04M in cyclohexane | — | FMC Lithium, Charlotte, NC |
| Potassium | Potassium, cubes (in mineral oil), L x W x H 40 mm x 30 mm x 20 mm, 99.5% trace metals basis | 679909 | Sigma-Aldrich Co. LLC., St. Louis, MO |
| Naphthalene | 99.6% | 33347 | Alfa Aesar., Ward Hill, MA. |
| Diphenylethylene | 1,1-Diphenylethylene, 98% | A14434 | Alfa Aesar., Ward Hill, MA. |
| 1,3-bis(1-phenylvinyl)benzene | — | TRA0159785 | Tractus Chemical LLC., London, England |

TABLE 1-continued

| Chemical Name (Abbreviation) | Description | Product Code or Trade Designation | Source |
|---|---|---|---|
| Me$_2$ClSiH | Chlorodimethylsilane, 98% | — | Sigma-Aldrich Co. LLC., St. Louis, MO |
| TBAF | Tetrabutylammonium Fluoride, 1.0M in tetrahydrofuran | 216143 | Sigma-Aldrich Co. LLC., St. Louis, MO |
| 1,2-Dipiperidinoethane (Dipip) | — | — | Sigma-Aldrich Co. LLC., St. Louis, MO |
| Aniline | 99+% | — | Alfa Aesar., Ward Hill, MA. |
| 2-methoxyethanol | 99% | — | Alfa Aesar., Ward Hill, MA. |
| THF | Tetrahydrofuran, anhydrous, ≥99.9%, inhibitor-free | — | Sigma-Aldrich Co. LLC., St. Louis, MO |
| Toluene | Anhydrous, 99.8% | — | Sigma-Aldrich Co. LLC., St. Louis, MO |
| Cyclohexane | Anhydrous | — | Sigma Aldrich Co. LLC., St. Louis, MO. |
| Benzene | — | OMNISOLV BX0212-6, | EMD Millipore, Burlington MA. |
| Dichloromethane (DCM) | — | OMNISOLV | EMD Millipore, Burlington MA. |
| Isopropanol (IPA) | — | — | VWR International, Batavia, IL. |
| Ethanol | Denatured ethyl alcohol, pure, anhydrous, greater than 99.5% | — | Sigma-Aldrich Co. LLC., St. Louis, MO |
| Methanol | — | OMNISOLV MX0480-6 | EMD Millipore, Burlington MA. |
| Basic alumina | Aluminum oxide, activated, basic | — | Sigma-Aldrich Co. LLC., St. Louis, MO |
| Silica gel | 60 Angstrom, 200-425 mesh | — | Sigma-Aldrich Co. LLC., St. Louis, MO. |
| Diatomaceous earth | — | CELITE 545 | EMD Millipore, Burlington MA. |
| Acetic acid (AcOH) | — | CHROMANORM, for HPLC | VWR International, Batavia, IL |
| Hydrochloric Acid | — | HX0603P-5 | EMD Millipore, Burlington MA. |

Substrates used in membrane preparation are summarized in Table 2.

TABLE 2

| Substrate | Product Code | Description | Source |
|---|---|---|---|
| PAN350 | PA350 | Polyacrylonitrile ultrafiltration membrane with a manufacturer-reported molecular weight cutoff of 150 kg/mol and pure water flux of 700 LMH/bar | Nanostone Water, Inc., Eden Prairie, MN |

TABLE 2-continued

| Substrate | Product Code | Description | Source |
|---|---|---|---|
| PV400 | PV400 M-PV400W-SPET) | Polyvinylidene fluoride ultrafiltration membrane | Solecta Membranes, Oceanside, CA |
| TESLIN SP 700 | TESLIN SP 700 | Porous polyolefin film | PPG Industries, Inc., Pittsburgh, PA |

Techniques

Dynamic Light Scattering

A dynamic light scattering (DLS) system (obtained under the trade designation "ZETASIZER NANO ZS" from Malvern Instruments, Malvern, UK) was used to analyze the morphology of the block copolymers (free chains, micelles or aggregates) in dilute solutions. Solutions for DLS were prepared at 0.1 wt % polymer in solvent and allowed to sit at least 12 hours at greater than 40° C. to dissolve. Clear, colorless solutions were filtered through a 0.22 micrometer or 0.45 micrometer polypropylene syringe filter into a quartz cuvette for measurement. Measurements were taken at 25° C. after the sample had equilibrated at 25° C. for 2 minutes in the holder. The instrument software automatically optimized the measurement settings at 173° C. through adjustment of the measurement position and attenuator. Fitting was done using pure solvent as the dispersant in the case of single solvent systems or two-solvent mixtures having at least 75% of one solvent, or as 50/50 mixtures in the case of two-solvent mixtures having less than 75% of one solvent. For reporting relative intensities of the forms of free chains, micelles, and aggregates, when a form has a signal intensity within plus or minus 20% of another form, each form is shown using an upper case letter, whereas when a form has a signal intensity outside that range, the form having the higher intensity signal (e.g., the dominant form) is shown using an upper case letter (i.e., F, M, or A) and the form having the lower intensity signal (the nondominant form) is shown using a lower case letter (i.e., f, m, or a).

Formation of Thin Composite Membranes

Block copolymer was dissolved in solvent mixtures at concentrations from 1.5-18 wt % and cast using an anti-sag meter (obtained under the trade designation "AP-B5402" from the Paul N. Gardner Company, Inc., Pompano Beach, FL) or a multiple clearance square applicator (obtained under the trade designation "AP-B5355" from the Paul N. Gardner Company, Inc.) with a gap height of 0.5-6 mil onto commercial porous supports ("TESLIN SP 700", "PAN350" and "PV400"). Some samples were simply dried under air flow to remove the solvent. Other samples were introduced into a water bath to remove residual solvent. After removal of residual solvent, the samples were dried at ambient conditions.

Flux Testing Procedure for Thin Composite Membranes Coated on Porous Substrates

Thin composite membrane samples were cut into 44-mm diameter discs and pre-wet with water. The samples were placed into a stirred-cell holder (obtained under the trade designation "AMICON STIRRED CELL MODEL 8050" from EMD Millipore, Billerica, MA). Stirring at a rate greater than or equal to 200 rpm was applied by a magnetic stir-plate, and pressure was applied using laboratory compressed air through a regulator at 20 psi (137.9 kPa). The sample disc was conditioned with steady transmembrane flow of water to achieve 40 mL permeate volume, or for 15 minutes, whichever came first. Steady-state flux was measured at this point. Units for flux measurements are liters per hour per square meter per bar (LMH/bar).

In a secondary method for testing flux, membrane samples were cut to a diameter of 25 mm and placed in a disc holder connected to a pressure pot. The pressure pot was filled with water and pressurized to 20 psi (137.9 kPa). Air bubbles were purged from the tubing and filter holder head space, and flux was measured over a 5 minute interval.

Atomic Force Microscopy (AFM) Imaging

Atomic force microscopy (AFM) is an imaging technique that consists of a flexible cantilever with a sharp tip attached to the cantilever's free end. AFM makes use of the forces of interaction between probe tip and sample, which cause the cantilever to deflect as it scans across the surface. At each x-y position, the cantilever deflection is measured via a laser beam reflected off the cantilever's backside and detected by a photodiode. The $z(x,y)$ data is used to construct a three-dimensional topography map of the surface. In Tapping Mode AFM, the tip/cantilever assembly is oscillated near the resonant frequency of the cantilever: the amplitude of vertical oscillation is the input parameter for the feedback loop used in topographical mapping. In a topographic AFM image, "brighter regions" correspond to peaks while "darker regions" correspond to valleys. The phase signal is the phase difference between the photodiode output signal and driving excitation source and is a map of how the phase of the AFM cantilever oscillation is affected by the tip-surface interaction. The physical meaning of the phase data is complex and phase contrast is generally influenced by material property differences such as composition, adhesion, viscoelasticity, dissipation as well as topographical contributions. The AFM data presented here were generated using one of two AFM instruments (obtained under the trade designations "DIMENSION ICON" or "DIMENSION FASTSCAN" from Bruker Corp., Santa Barbara, CA) along with controllers (obtained under the trade designation "NANOSCOPE V" from Bruker Corp., Santa Barbara, CA) and software (obtained under the trade designation "NANOSCOPE 8.15" from Bruker Corp., Santa Barbara, CA). The "DIMENSION FASTSCAN" instrument was used with either of two probes (obtained under the trade designations "FASTSCAN-A" [$f0=1.4$ MHz, $k=18$ N/m, tip radius (nom)=5 nm]or "OTESPA R3" [$f0=300$ kHz, $k=26$ N/m, tip radius (nom)=7 nm]from Bruker AFM Probes, Camarillo, CA). The "DIMENSION ICON" AFM instrument was used only with an "OTESPA R3" probe. For the purposes of the tests described in these Examples, results are believed to be equivalent regardless of which AFM instruments and AFM probes were employed. The tapping setpoint was typically 85% of the free air amplitude. All AFM imaging was performed under ambient conditions. Software (obtained under the trade designationa "NANOSCOPE ANALYSIS 1.80" from Bruker, and "SPIP 6.5.1" from Image Metrology A/S, Horsholm, Denmark) were used for image processing and analysis. Generally, images were processed with a first order planefit to remove sample tilt and with a 0th order flatten to remove z-offsets or horizontal skip artifacts. In some cases, to enhance visualization of features, the images were processed with a 3rd order planefit to remove tilt and bow, or processed with an L-filter to remove background waviness.

Scanning Electron Microscopy (SEM) Imaging

The samples for surface images were mounted on conductive carbon tape tabs. The tabs were mounted on an SEM stub and a thin coating of AuPd (20 mA/25 sec) was deposited to make them conductive. Imaging was conducted at 2 kv, and 4.0-4.3 mm working distance (WD), with a secondary electron (SE) detector and in Low Mag Mode, with no tilt, at 30 kx or 70 kx magnification. A field emission scanning electron microscope (obtained under the trade designation "HITACHI SU-8230" from Hitachi High-Technologies, Tokyo, Japan) was used for imaging. Cross-sections of samples for cross-sectional images were made by cutting under liquid nitrogen and were mounted for examination. A thin coating of metal was deposited to make the samples conductive. Conditions used were 2 kv, 4.3 mm WD, with an SE detector, with no tilt, and magnifications employed included: 10 kx, 30 kx, and 70 kx.

Reagent Drying

Polymer synthesis and reagent manipulations were conducted in a glovebox (obtained under the trade designation "MBRAUN LABMASTER SP" from MBraun Inc., Stratham, NH, USA) or in custom glassware designed to enable anionic polymerizations (for example, see Ndoni et al., Laboratory-scale Setup for Anionic Polymerization under Inert Atmosphere, *Review of Scientific Instruments.* 66(2), 1090-1095 (1995)). Standard air-free techniques were used for reagent manipulations.

Benzene was degassed by bubbling with argon (Ar) gas for longer than one hour before being cannula-transferred to a Strauss flask containing degassed 1,1-diphenylethylene. Sec-BuLi was then added under Ar counterflow via syringe, causing a very gradual color change from light yellow to deep, wine red over the course of an hour.

Styrene was stirred over calcium hydride (CaH$_2$) overnight, degassed with three freeze-pump-thaw cycles, and then vacuum-transferred into a Schlenk bomb containing dried dibutylmagnesium. After stirring overnight in an Ar atmosphere, styrene was again vacuum-transferred into a receiving flask to afford a final, dry monomer.

THF solvent was purified via a solvent purification system (obtained from Pure Process Technology, LLC, Nashua, New Hampshire).

Isoprene was dried as detailed for styrene, with sequential vacuum transfers from CaH$_2$ and dibutyl-magnesium.

Butadiene was condensed in a flask containing n-butyllithium (solvent removed in vacuo) cooled in liquid nitrogen, thawed in an ice water bath at 0° C. and stirred for 30 minutes, vacuum transferred to a second flask containing n-butyllithium (solvent removed in vacuo) and stirred for an additional 30 minutes at 0° C. before collecting the purified monomer in a flask by vacuum transfer.

Ethylene oxide was condensed in a flask cooled in liquid nitrogen, thawed in an ice water bath at 0° C., vacuum transferred to a second flask containing n-butyllithium (solvent removed in vacuo) and stirred for 30 minutes at 0° C. before collecting the purified monomer in a flask by vacuum transfer.

1,2-Dipiperidinoethane was purified initially with CaH$_2$ followed by purification with sodium mirrors (as it is very hydroscopic) and afterwards, it was dissolved in benzene until proper concentration for each experiment was reached.

All other chemicals were used as received.

Gel Permeation Chromatography (GPC)

The GPC equipment included a liquid chromatography system (obtained under the trade designation "1260 INFINITY LC" from Agilent Technologies, Santa Clara, CA), which included a quaternary pump, autosampler, column compartment, and diode array detector. It was operated at a flow rate of 1.0 milliliters per minute (mL/min). The GPC column set included two 300 millimeters (mm) length×7.5 mm internal diameter columns (obtained under the trade designations "PLGEL MIXED-A" (and "PLGEL MIXED-B", both from Agilent Technologies, Santa Clara, CA). The detection included an 18 angle light scattering detector, a viscometer, and a differential refractive index detector (obtained under the trade designations "DAWN HELEOS II", "VISCOSTAR", and "OPTILAB T-REX", respectively, from Wyatt Technology Corporation, Santa Barbara, CA). Data were collected and analyzed using commercial software (obtained under the trade designation "ASTRA" (version 6) from Wyatt Technology Corporation). The column compartment, viscometer, and differential refractive index detector were set to 40° C. The solvent and eluent (or mobile phase) included "OMNISOLV" grade tetrahydrofuran (stabilized with 250 parts per million of butylated hydroxytoluene) modified with 5 percent (volume/volume) triethylamine (both obtained from EMD Millipore Corporation, Burlington, MA). The weight average molecular weight ($M_w$), the number average molecular weight ($M_n$), and the dispersity (Đ) were calculated.

Nuclear Magnetic Resonance (NMR)

A portion of the polymer sample was analyzed as a solution of unknown concentration (generally approximately 12 milligrams per milliliter (mg/mL)) in deuterated chloroform (CDCl$_3$). NMR spectra were acquired on a Bruker AVANCE 600 MHz NMR spectrometer (Billerica, MA, USA) equipped with an inverse cryoprobe.

PE 1: Preparation of Hydroxyl-Terminated polyisoprene-polystyrene (IS—OH)

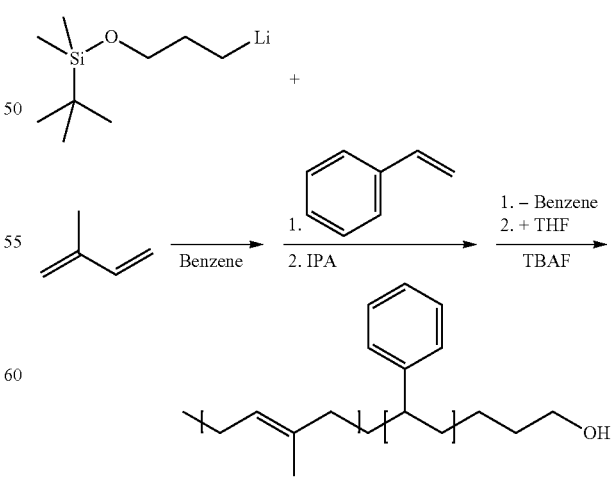

In a glovebox, benzene (approximately 600 mL) and styrene (43.60 g, 419 mmol) were added to a 1 L Schlenk flask with stir bar. Under vigorous stirring, TBDMSPL (0.63 mL, 0.63 mmol) was rapidly injected with a syringe. The color of the reaction slowly changed color from colorless to orange over the course of 15 minutes. The polymerization reaction was stirred at room temperature in the glovebox for 48 hours. After 48 hours, isoprene (21.10 g, 309 mmol) was added, causing the reaction to rapidly change color to pale yellow. The polymerization reaction was stirred for an additional 24 hours, over which time it became more viscous. The polymerization was quenched with degassed isopropanol 24 hours after introduction of isoprene.

Solvent was then removed from the polymer solution under reduced pressure and the polymer product was redissolved in approximately 400 mL THF. TBAF (5.0 mL, 5.0 mmol) was then added and the reaction stirred for 8 hours at room temperature under a nitrogen blanket. Next, approximately 15 mL acetic acid was added, and the solution was stirred for an additional hour. The reaction was then precipitated from methanol and the isolated solid was re-dissolved in cyclohexane. After filtration through silica gel, the polymer was precipitated from isopropanol and dried under reduced pressure. Polymer product was analyzed by $^1$H-NMR and GPC. Product was found to contain 65.5 percent by mass styrene and 33.5 percent by mass isoprene. An $M_w$ of 101 kg/mol and a dispersity of 1.02 was determined by GPC.

PE 2: Preparation of Polyisoprene-b-Polystyrene-b-Polypropylene Oxide (ISP)

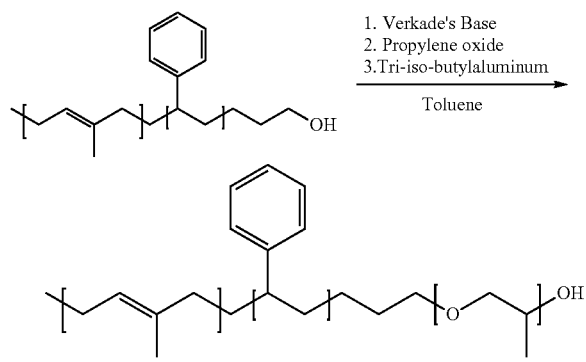

In an inert, Ar atmosphere, PE 1 (63.1 g, 0.549 mmol —OH) and toluene (235 mL) were added to a 420 mL glass pressure vessel equipped with glass stir bar. Once the polymer had fully dissolved, Verkade's base (165 mg dissolved in 5 mL toluene, 0.549 mmol) was added causing a very slight color change to pale yellow. The solution was stirred at room temperature for 1 hour. After 1 hour, propylene oxide was added (65 mL) and the solution was stirred for five minutes to ensure complete dissolution. After five minutes, tri-iso-butylaluminum (2.1 mL, 2.1 mmol) was added and the pressure vessel quickly capped. Within a couple of minutes, bubbles had formed in the solution and the viscosity had increased. After five minutes, the reaction flask was warm/hot to the touch. The exotherm continued for several hours over which time the viscosity grew further, although not at the rate of the first 10 minutes after aluminum addition.

The reaction was stirred for three days, after which time a hazy, opaque, solution developed. The reaction product was precipitated from HCl/methanol (approximately 500 mL MeOH, approximately 30 mL conc. HCl), isolated by filtration, and dried before being re-dissolved in THF (minimal, approximately 200 mL). The THF solution was precipitated from acidic methanol (same conc. as before) and isolated by filtration. The fine supernatant was compressed by centrifugation (10 min 3000 rpm) prior to filtration. The white polymer was dried and analyzed by $^1$H-NMR and GPC. Product was found to contain 57.4 percent by mass styrene, 27.3 percent by mass isoprene, and 15.3% by mass propylene oxide. An $M_w$ of 143 kg/mol and a dispersity of 1.02 was determined by GPC.

Preparation of Hydroxyl-Terminated polystyrene-b-polyisoprene (SI—OH)

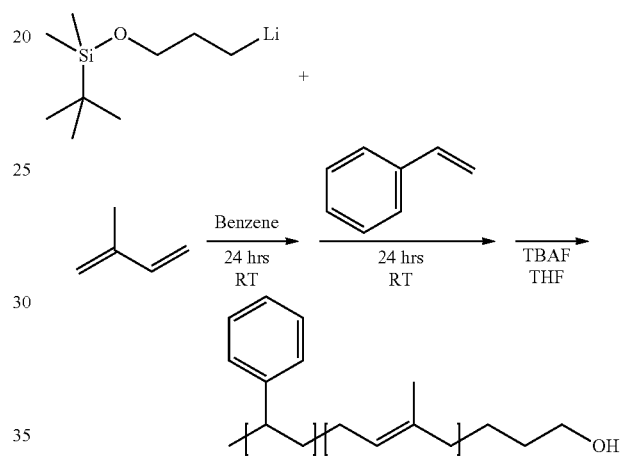

Generally, SI—OH was prepared by sequential anionic polymerization initiated with a silane-protected initiator. The product polymer was then deprotected to yield a hydroxy-terminated diblock copolymer. A representative synthetic procedure is outlined below. Alterations to reagent amounts were employed to afford corresponding products with higher or lower molecular weight and varying weight fractions of polystyrene or polyisoprene.

In a glovebox, benzene (approximately 600 mL) and isoprene (20.23 g, 297 mmol) were added to a 1 L Schlenk flask with stir bar. Under vigorous stirring, protected initiator (0.38 mL, 0.38 mmol) was rapidly injected with a syringe. The polymerization was stirred at room temperature in the glovebox for 24 hours. After 24 hours, styrene (44.55 g, 428 mmol) was added, causing the reaction to rapidly change color to orange. The polymerization was stirred for an additional 24 hours over which time it became more viscous. The polymerization was then quenched with degassed isopropanol.

Solvent was then removed from the polymer solution under reduced pressure and the polymer product was dissolved in approximately 400 mL THF. TBAF (5.0 mL, 5.0 mmol) was then added and the reaction stirred for 8 hours at room temperature under a nitrogen blanket. Next, approximately 15 mL acetic acid was added, and the solution was stirred for an additional hour. The reaction was then precipitated from methanol and the isolated solid was dissolved in cyclohexane. After filtration through silica gel, the polymer was precipitated from isopropanol and dried under reduced pressure. Polymer product was analyzed by $^1$H-NMR and GPC. Results are summarized in Table 3.

TABLE 3

| Preparatory Example | Mass % Isoprene | Mass % Styrene | $M_w$ (kg/mol) | Đ |
|---|---|---|---|---|
| PE 3 | 31.2 | 68.8 | 167 | 1.09 |
| PE 4 | 32.2 | 67.8 | 151 | 1.01 |

Preparation of
polystyrene-b-polyisoprene-b-polypropyleneoxide
(SIP)

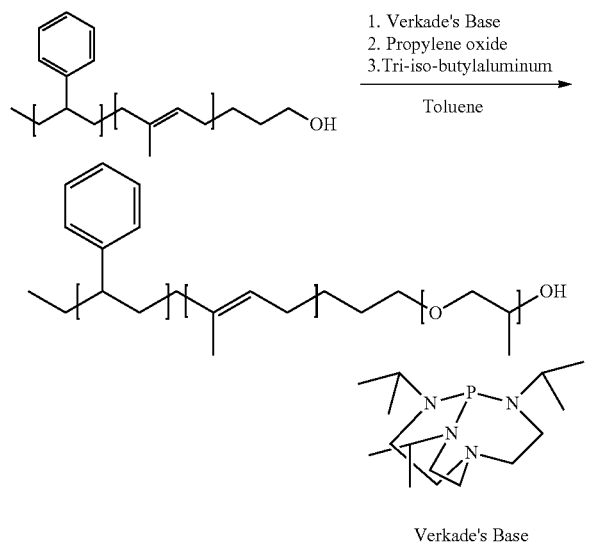

Generally, SIP was prepared by chain extension of SI—OH with anionic ring-opening polymerization of propylene oxide. A representative synthetic procedure for PE 6 is outlined below. Alterations to reagent amounts were employed to afford corresponding products with higher or lower molecular weight and varying weight fractions of polystyrene, polyisoprene, and polypropylene oxide.

In the glovebox, PE 4 (59.17 g, 0.392 mmol —OH) and toluene (235 mL) were added to a 420 mL glass pressure vessel equipped with glass stir bar. Once the polymer had fully dissolved, Verkade's base (132 mg dissolved in 5 mL toluene, 0.439 mmol) was added causing a very slight color change to pale yellow. The solution was stirred at room temperature for 1 hour. After 1 hour, propylene oxide was added (60 mL) and the solution was stirred for five minutes to ensure complete dissolution. After five minutes, tri-iso-butylaluminum (1.7 mL, 1.7 mmol) was added and the pressure vessel was quickly capped. Within a couple of minutes, bubbles had formed in the solution and the viscosity had increased. After five minutes, the reaction flask was warm/hot to the touch. The exotherm continued for several hours over which time the viscosity grew further, although not at the rate of the first 10 minutes after aluminum addition.

The reaction was stirred for three days, after which time a hazy, opaque, white solution developed. The reaction product was precipitated from HCl/methanol (approximately 500 mL MeOH, approximately 30 mL conc. HCl), isolated by filtration, and dried before being dissolved in THF (minimal, approximately 200 mL). The THF solution was precipitated from acidic methanol (same conc. as before) and isolated by filtration. The fine supernatant was compressed by centrifugation (10 min 3000 rpm) prior to filtration. The white polymer was dried and analyzed by $^1$H-NMR and GPC. Results are summarized in Table 4.

TABLE 4

| Preparatory Example | Precursor Polymer | Mass % Styrene | Mass % Isoprene | Mass % Propylene Oxide | $M_w$ (kg/mol) | Đ |
|---|---|---|---|---|---|---|
| PE 5 | PE 3 | 59.2 | 29.6 | 11.2 | 194 | 1.14 |
| PE 6 | PE 4 | 57.8 | 27.8 | 14.4 | 182 | 1.03 |

Preparation of Hydroxyl-terminated
Poly(isoprene-styrene-isoprene) Block Copolymer
(HO—ISI—OH) Using Sequential Addition and
Ethylene Oxide Termination

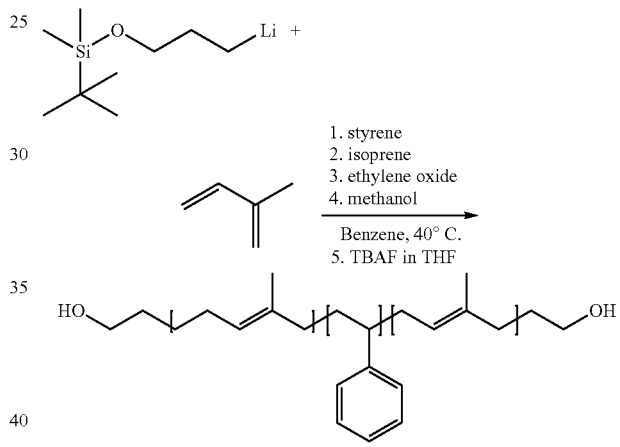

A 2 L polymerization reactor apparatus was constructed and inert Ar atmosphere established, then 666 g of purified benzene was added to the reactor. TBDMSPL protected initiator (0.45 mL) was then added to the reactor and stirred for 30 minutes. Purified isoprene (10.1 g) was then added to the reactor. After reacting for approximately 1 hour at room temperature, the reactor was heated using a water bath with a setpoint of 40° C. Approximately 5 hours after the addition of isoprene, purified styrene (37.1 g) was added to the reactor. Approximately 18 hours after the addition of styrene, a second amount of purified isoprene (10.1 g) was added to the reactor. Approximately 5 hours after the second addition of isoprene, a large molar excess (2 g) of ethylene oxide was added to the reactor. The reactor was then allowed to cool to room temperature. Approximately 72 hours after the addition of ethylene oxide, the reaction was terminated with degassed methanol to yield a monohydroxyl end functional RO—ISI—OH triblock copolymer.

To yield a dihydroxyl terminal ISI triblock copolymer (HO—ISI—OH), benzene solvent was removed by rotary evaporation and the resulting polymer was dissolved in 400 mL of tetrahydrofuran. A 10× molar excess of TBAF relative to the initiator was added to the THF solution (4.5 mL of 1.0 M TBAF in THF) and the solution was stirred at room temperature for at least 18 hours. The THF solvent was removed by rotary evaporation and the resulting polymer was dissolved in 400 mL of methylene chloride. The methylene chloride solution was washed with several 300 mL aliquots of distilled water. The methylene chloride was removed by rotary evaporation and the polymer was redissolved in approximately 400 mL of THF, the solution was precipitated from an isopropanol/methanol mixture (1:3), and the resulting white solid was isolated by filtration and dried in vacuo to yield 55 g of dried polymer.

Polymer composition was determined by $^1$H-NMR; polymer molecular weight and dispersity by GPC analysis. Results are summarized in Table 5.

TABLE 5

| Preparatory Example | Mass % Isoprene | Mass % Styrene | $M_w$ (kg/mol) | Đ |
|---|---|---|---|---|
| PE 7 | 35 | 65 | 181 | 1.03 |

Preparation of Poly(ethylene oxide-isoprene-styrene-isoprene-ethylene oxide) Block Copolymer (OISIO)

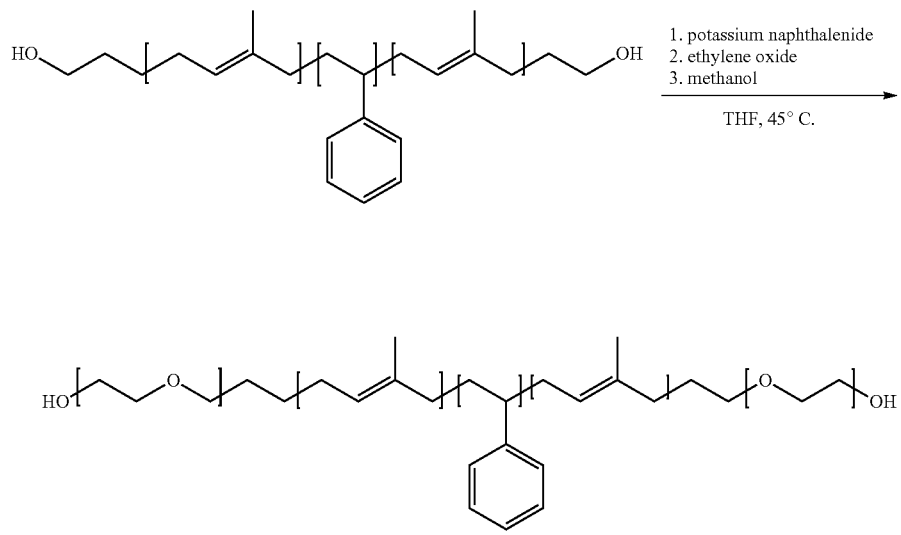

A 1 L polymerization reactor apparatus was constructed and inert Ar atmosphere established. PE 7 triblock copolymer (15.0 g) was dissolved in approximately 100 mL benzene added to the reactor. The reactor was sealed, the benzene solution was frozen using liquid nitrogen, and then the reactor was placed under dynamic vacuum to remove the benzene solvent by freeze drying over a period of approximately 24 hours. Tetrahydrofuran (614 g) was then added to the reactor. The reactor was stirred and heated with an oil bath set to a setpoint of 45° C. to dissolve the polymer.

Potassium naphthalenide initiator solution was prepared by adding a 10% molar excess of naphthalene (2.88 g) and dry tetrahydrofuran solvent (119 g) to potassium metal (0.8 g). The solution was stirred under an Ar atmosphere for at least 24 hours, resulting in a dark green solution.

Potassium naphthalenide initiator solution was slowly added dropwise to the reactor until a pale green color persisted for at least 30 minutes, indicating the endpoint of the titration to deprotonate the HO—ISI—OH triblock copolymer. Ethylene oxide (2.5 g) was added to the reactor and the reaction proceeded for approximately 72 hours prior to termination with methanol degassed by bubbling with argon for 60 minutes.

To isolate the solid polymer, the tetrahydrofuran solvent was removed by rotary evaporation and the resulting polymer was dissolved in 300 mL of methylene chloride and washed with several 300 mL aliquots of distilled water. The methylene chloride solvent was removed by rotary evaporation and the resulting polymer was dissolved in 150 mL of benzene and freeze dried to yield an off-white polymer.

Polymer composition was determined by $^1$H-NMR; polymer molecular weight and dispersity by GPC analysis. Results are summarized in Table 6.

TABLE 6

| Preparatory Example | Precursor Polymer | Mass % Isoprene | Mass % Styrene | Mass % Ethylene Oxide | $M_w$ (kg/mol) | Đ |
|---|---|---|---|---|---|---|
| PE 8 | PE 7 | 30 | 57 | 13 | 209 | 1.06 |

Hydroxyl-terminated Poly(styrene-isoprene-styrene) Block Copolymer (HO—SIS—OH) Using Sequential Addition and Ethylene Oxide Termination

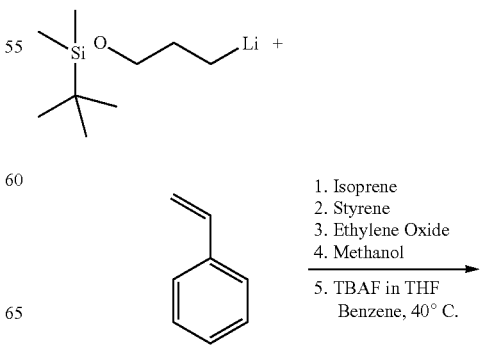

-continued

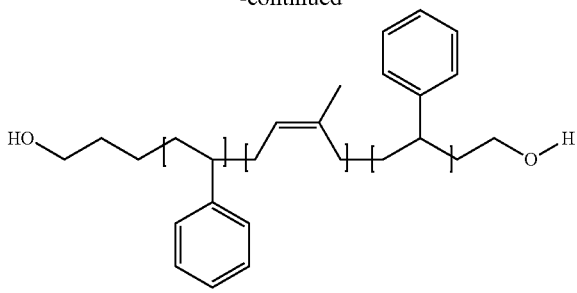

Generally, HO—SIS—OH was prepared by sequential anionic polymerization using a protected initiator. A representative synthetic procedure for PE 9 is outlined below. Alterations to reagent amounts were employed to afford corresponding products with higher or lower molecular weight and varying weight fractions of polystyrene and polyisoprene.

A 2 L polymerization reactor apparatus was constructed and inert Ar atmosphere established. 730 g of purified benzene was added to the reactor. TBDMSPL protected initiator (0.37 mL) was then added to the reactor and stirred for 30 minutes. Purified styrene (15.3 g) was then added to the reactor. After reacting for approximately 1 hour at room temperature, the reactor was heated to 40° C. via a water bath. Approximately 24 hours after the addition of styrene, isoprene (12.5 g) was added to the reactor. Approximately 24 hours after the addition of isoprene, 15.6 g of styrene was added to the reactor. Approximately 24 hours after the second addition of styrene, a large molar excess (3.5 g) of ethylene oxide was added to the reactor resulting in a color change from orange to colorless. The reactor was then allowed to cool to room temperature. Approximately 16 to 96 hours after the addition of ethylene oxide, the reaction was terminated with degassed methanol to yield a monohydroxyl end functional RO—SIS—OH triblock copolymer.

To yield a dihydroxyl terminal SIS triblock copolymer (HO—SIS—OH), benzene solvent was removed by rotary evaporation and the resulting polymer was dissolved in 400 mL of tetrahydrofuran. A 10× molar excess of TBAF relative to the initiator was added to the THF solution (3.7 mL of 1.0 M TBAF in THF) and the solution was stirred at room temperature for at least 18 hours. The THF solvent was removed by rotary evaporation and the resulting polymer was dissolved in 500 mL of dichloromethane. The dichloromethane solution was washed with at least 3 300 mL aliquots of distilled water. The washed dichloromethane solution was precipitated in cold methanol and the resulting white solid was isolated by filtration and dried in vacuo.

Polymer composition was determined by $^1$H-NMR; polymer molecular weight and dispersity by GPC analysis. Results are summarized in Table 7.

TABLE 7

| Preparatory Example | Mass % Isoprene | Mass % Styrene | $M_w$ (kg/mol) | Đ |
|---|---|---|---|---|
| PE 9 | 29.0 | 71.0 | 184 | 1.10 |
| PE 10 | 34.0 | 66.0 | 92 | 1.06 |
| PE 11 | 34.0 | 66.0 | 113 | 1.03 |
| PE 12 | 31.0 | 69.0 | 114 | 1.05 |
| PE 13 | 36.0 | 64.0 | 127 | 1.02 |
| PE 14 | 37.0 | 63.0 | 135 | 1.03 |
| PE 15 | 32.0 | 68.0 | 147 | 1.01 |

Synthesis of Poly(propyleneoxide-styrene-isoprene-styrene-propyleneoxide) Block Copolymers (PSISP)

PSISP block copolymers were prepared by chain extension of HO—SIS—OH with propylene oxide as described in Example 4 of WO2018098023. Alterations to reagent amounts were employed to afford corresponding products with higher or lower molecular weight and varying weight fractions of polypropylene oxide. In examples PE 17, PE 18, PE 19, and PE 20 Verkade's base was used in place of the P4 phosphazene base (1-tert-Butyl-4,4,4-tris(dimethylamino)-2,2-bis[tris(dimethylamino)-phosphoranylidenamino]-2λ$^5$,4λ$^5$-catenadi(phosphazene) obtained from Sigma-Aldrich Co. LLC., St. Louis, MO) In examples PE 18, PE 19, and PE 20 triethylborane (obtained from Sigma-Aldrich Co. LLC., St. Louis, MO as a 1.0 M solution in hexanes) was used in place of tri-isobutyl aluminum. PSISP block copolymer molecular weights and compositions are summarized in Table 8.

TABLE 8

| Preparatory Example | Precursor Polymer | Mass % Isoprene | Mass % Styrene | Mass % Propylene Oxide | $M_w$ (kg/mol) | Đ |
|---|---|---|---|---|---|---|
| PE 16 | PE 11 | 25 | 48 | 27 | 137 | 1.06 |
| PE 17 | PE 12 | 22 | 49 | 29 | 153 | 1.04 |
| PE 18 | PE 13 | 28 | 51 | 21 | 151 | 1.02 |
| PE 19 | PE 14 | 28 | 49 | 22 | 164 | 1.04 |
| PE 20 | PE 15 | 26 | 54 | 20 | 180 | 1.01 |

Synthesis of Poly(ethylene oxide-styrene-isoprene-styrene-ethylene oxide) Block Copolymers (OSISO)

OSISO block copolymers were prepared as described in Example 2 of WO2018098023 and are summarized in Table 9.

TABLE 9

| Preparatory Example | Precursor Polymer | Mass % Isoprene | Mass % Styrene | Mass % Ethylene Oxide | $M_w$ (kg/mol) | Đ |
|---|---|---|---|---|---|---|
| PE 21 | PE 9 | 24 | 58 | 18 | 225 | 1.10 |
| PE 22 | PE 9 | 23 | 56 | 21 | 230 | 1.08 |
| PE 23 | PE 10 | 32 | 61 | 8 | 99 | 1.05 |
| PE 24 | PE 10 | 30 | 58 | 12 | 109 | 1.07 |

PE 25: Preparation of Polyisoprene-b-Polystyrene-b-1,2-Polybutadiene (ISB)

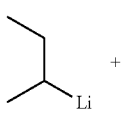

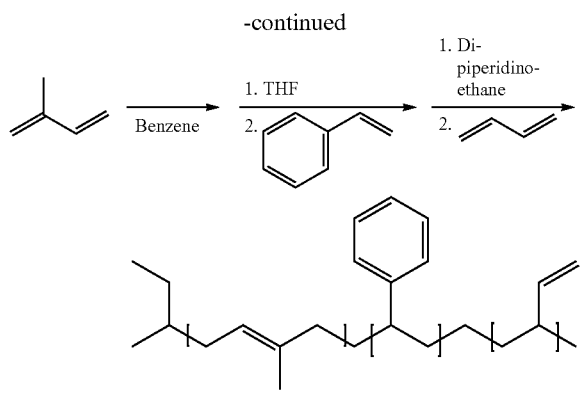

Polymerization of isoprene, followed by that of styrene, and of butadiene were the three basic steps for the synthesis of the final linear triblock terpolymer via anionic polymerization and high vacuum techniques.

In a 2 L glass apparatus the PI living chain [PI$^{(-)}$Li$^{(+)}$] was synthesized by polymerizing 9.0 g of isoprene (0.13 mol) with sec-BuLi (2×10−4 mol) in 1200 ml of benzene at room temperature for 24 hours. The molecular weight of the first block (PI) was measured using GPC leading to a value of M$_n$ (number average molecular weight) approximately equal to 43.000 g/mol and a dispersity of 1.03. In order to increase the initiation rate of the styrene (second monomer) towards the PI$^{(-)}$Li$^{(+)}$ macroinitiator for the ABC triblock terpolymers, a small amount of THF (1-2 ml) was added leading to a very fast initiation step, and the narrow distribution of the intermediate diblock product was ensured. Afterwards, 18.0 g of styrene (0.17 mol) were added and allowed to react for 24 hours at room temperature. The total molecular weight of the diblock copolymer (PI-b-PS) was measured using GPC leading to a value of Mn (number average molecular weight) approximately equal to 128.000 g/mol and a dispersity of 1.04. Then, 3 ml of 1,2-Dipip (4×10−4 mol) diluted in benzene was added in the PI-b-PS$^{(-)}$Li$^{(+)}$ solution and the solution was left under stirring for 1 hour to alter the polarity. The ratio between the initial initiator concentration and that of the Dipip was approximately 1:2. Finally, 3.0 g (0.055 mol) of 1,3 butadiene were added and allowed to react for 24 hours at 4° C. in order to better control the polymerization reaction. This procedure under the specific conditions described (concentration, temperature, solvent mixture) drove the reaction kinetics towards almost 100%-1,2 addition and not the usual 92%-1,4 and 8%-1,2, which would be obtained without polar additives during anionic polymerization. The total molecular weight of the final triblock terpolymer (PI-b-PS-b-PB1,2) was measured using GPC leading to a value of M$_n$ (number average molecular weight) approximately equal to 142.000 g/mol and a dispersity of 1.07.

The final triblock terpolymer ISB (approximately 27 grams) was precipitated in excess of methanol, and the precipitated final product was dried in a vacuum oven at 50° C. for 48 hours. After the polymerization of each monomer, a small amount (approximately 1 g) was always removed from the apparatus for characterization via GPC. The 100%-1,2 microstructure in the PB segments is straightforward since it appears in specific chemical shifts as indicated by $^1$H-NMR (Proton Nuclear Magnetic Resonance) spectra when compared to a PB synthesized by anionic polymerization of butadiene in nonpolar environment (leading to 92% 1,4-content and 8% 1,2-content).

PE 26: Hydrosilylation of ISB with ClMe$_2$SiH and Substitution with 2-Methoxyethanol

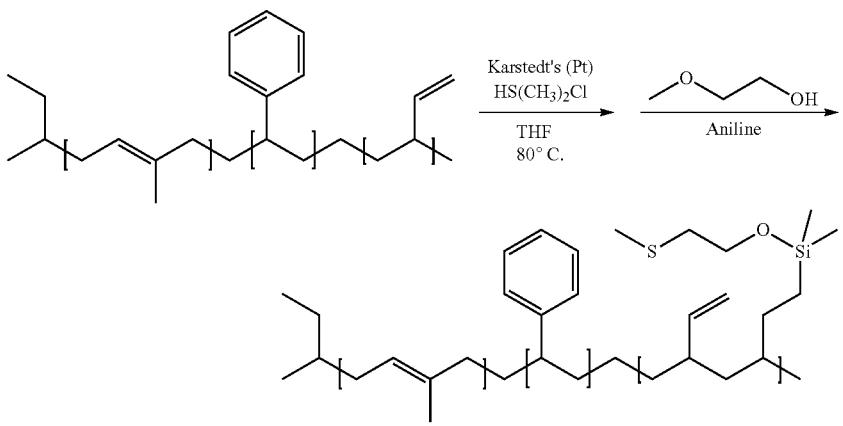

ISB (12.53 g, 42.6 mmol 1,2-polybutadiene repeat units) was dissolved in THF (70.0 mL) in a 350 mL sealable glass pressure vessel equipped with stirbar. Once the polymer had dissolved, Karstedt's catalysts were added (0.350 mL, 7 mg Pt, 0.036 mmol Pt), followed by chlorodimethylsilane (4.0 mL, 36 mmol). The pressure vessel was capped and heated to 85° C. for' 12 hours before being cooled to room temperature. Initiation was indicated by a darkening of the solution from colorless to dark yellow, orange, or light brown as Pt nanoparticles were formed. A highly variable latency period ranging from 10 minutes to four hours was observed.

Once cooled to room temperature, aniline (5.0 mL, 54.9 mmol) and 2-methoxyethanol (4.3 mL, 54.5 mmol) were sequentially added. Over a period of thirty minutes, fine white precipitate formed. After stirring for an additional two hours, the reaction was filtered through CELITE 545 and evaporated to dryness. The polymeric residue was extracted with dichloromethane, and the solution filtered through CELITE 545. The product filtrate was then re-dissolved in THE prior to precipitation from methanol.

Polymer was characterized by NMR and GPC after drying. $^1$H-NMR indicates approximately 60% conversion of polybutadiene pendant C=C, with less than 10% conversion of polyisoprene pendant C=C. GPC shows a slight increase in dispersity to approximately 1.3.

Preparation of poly(4-vinylpyridine)-b-polystyrene-b-polyisoprene-b-polystyrene-b-poly(4-vinylpyridine) (VSISV)

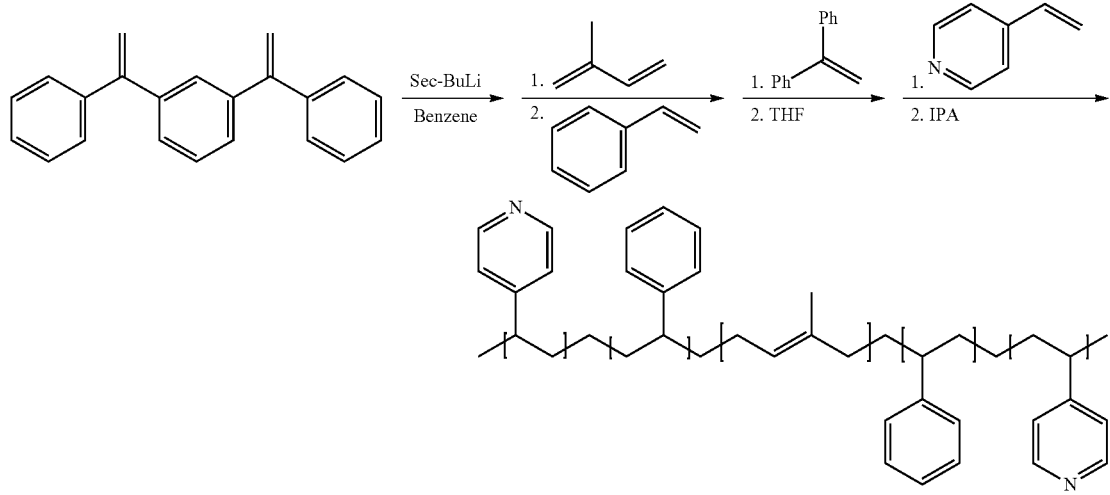

Generally, VSISV was prepared by sequential anionic polymerization using a difunctional anionic initiator derived from sec-BuLi and 1,3-bis(1-phenylvinyl)benzene.

1,3-bis(1-phenylvinyl)benzene was added to a 1 L reactor flask and dissolved in benzene. Once dissolved, sec-butyllithium (2 eq relative to 1,3-bis(1-phenylvinyl)benzene) was added, causing an immediate color change from colorless to deep, wine red. The contents of the flask were stirred at room temperature for 8 hours before isoprene was added, causing an immediate color change from deep red to pale yellow. Once isoprene was added, the polymerization was stirred at room temperature for 24 hours. Next, styrene was added, resulting in a gradual color change from pale yellow to orange. The polymerization was allowed to react for a further 24 hours at room temperature.

1,1-diphenylethylene was added (1.2 eq relative to sec-butyllithium) and the reaction stirred for 1 hour. The polymerization was then diluted with THF (3×volume of benzene used) and then cooled to −78° C. Once cooled, 4-VP was added and the polymerization was stirred at −78° C. for two hours before being quenched with degassed isopropanol.

Polymer was isolated by precipitation from water. The isolated polymer was then dried under reduced pressure, re-dissolved in minimal THF, and precipitated a second time from water to afford a white, rubber solid. Product polymers were characterized by $^1$H-NMR and GPC. Results are summarized in Table 10.

TABLE 10

| Preparatory Example | Mass % Isoprene | Mass % Styrene | Mass % 4-Vinyl Pyridine | $M_w$ (kg/mol) | Đ |
|---|---|---|---|---|---|
| PE 27 | 33 | 46 | 21 | 160 | 1.20 |
| PE 28 | 35 | 48 | 17 | 108 | 1.18 |
| PE 29 | 36 | 48 | 16 | 142 | 1.23 |

Comparative Examples Coated onto Dense Film

PSISP Coated onto PET Film

PSISP block copolymer from PE 16 was dissolved in 60/40 wt/wt NMP/MEK at a concentration of 13 wt %. The solution was coated on a polyethylene terephthalate (PET) film (obtained under the trade designation "LUMIRROR" from Toray Plastic America, Inc., North Kingstown, RI) using an anti-sag meter with coating gap heights ranging from 1 to 6 mil (25.4 to 152.4 micrometers) in 0.5 mil (12.7 micrometer) increments. After a 15 second delay, the coating was immersed in water to remove residual solvent. Per AFM analysis, coatings at all thicknesses exhibited features at least 100 nanometers in size. No evidence of isoporosity was observed at any gap height.

Examples Coated onto Porous Membrane

PSISP Coated onto Polyacrylonitrile Ultrafiltration Membrane

PSISP block copolymer from PE 16 was dissolved in 60/40 w/w NMP/MEK at a concentration of 13 wt %. A sample was coated onto a polyacrylonitrile ultrafiltration membrane ("PAN350") using an anti-sag meter with coating gap heights ranging from 1 to 6 mil (25.4 to 152.4 micrometers) in 0.5 mil (12.7 micrometer) increments. After a 15 second delay, the coating was immersed in water to remove residual solvent. Conditions and results are summarized in Table 11. Per AFM analysis, coatings with a gap height of 1 and 1.5 mil (25.4 and 38.1 micrometers) exhibit isopores. At higher gap heights, non-isoporous structures are seen.

TABLE 11

| Example | Gap Height (mil/micrometers) | Appearance by AFM |
|---|---|---|
| EX 1 | 1/25.4 | Isoporous |
| EX 2 | 1.5/38.1 | Isoporous |
| EX 3 | 2/50.8 | Not isoporous |
| EX 4 | 2.5/63.5 | Not isoporous |
| EX 5 | 3/76.2 | Not isoporous |
| EX 6 | 3.5/88.9 | Not isoporous |
| EX 7 | 4/101.6 | Not isoporous |
| EX 8 | 4.5/114.3 | Not isoporous |
| EX 9 | 5/127 | Not isoporous |

TABLE 11-continued

| Example | Gap Height (mil/micrometers) | Appearance by AFM |
|---|---|---|
| EX 10 | 5.5/139.7 | Not isoporous |
| EX 11 | 6/152.4 | Not isoporous |

PSISP Coated onto Teslin Porous Polyolefin Film

PSISP block copolymer from PE 16 was dissolved in 60/40 w/w NMP/MEK at a concentration of 13 wt %. A sample was coated onto porous polyolefin film ("TESLIN SP 700") using an anti-sag meter with coating gap heights ranging from 1 to 6 mil (25.4 to 152.4 micrometers) in 0.5 mil (12.7 micrometer) increments. After a 15 second delay, the coating was immersed in water to remove residual solvent. Conditions and results are summarized in Table 12. Per AFM analysis, coatings with a gap height of 1, 1.5, and 2 mil (25.4, 38.1, and 50.8 micrometers) exhibit isopores. At higher gap heights, non-isoporous structures are seen.

TABLE 12

| Example | Gap Height (mil/micrometers) | Appearance by AFM |
|---|---|---|
| EX 12 | 1/25.4 | Isoporous |
| EX 13 | 1.5/38.1 | Isoporous |
| EX 14 | 2/50.8 | Isoporous |
| EX 15 | 2.5/63.5 | Not isoporous |
| EX 16 | 3/76.2 | Not isoporous |
| EX 17 | 3.5/88.9 | Not isoporous |
| EX 18 | 4/101.6 | Not isoporous |
| EX 19 | 4.5/114.3 | Not isoporous |
| EX 20 | 5/127 | Not isoporous |
| EX 21 | 5.5/139.7 | Not isoporous |
| EX 22 | 6/152.4 | Not isoporous |

PSISP Coated onto Polyvinylidene Fluoride Ultrafiltration Membrane

PSISP block copolymer from PE 16 was dissolved in 60/40 w/w NMP/MEK at a concentration of 13 wt %. A sample was coated onto a polyvinylidene fluoride ultrafiltration membrane ("PV400") using an anti-sag meter with coating gap heights ranging from 1 to 6 mil (25.4 to 152.4 micrometers) in 0.5 mil (12.7 micrometer) increments. After a 15 second delay, the coating was immersed in water to remove residual solvent. Conditions and results are summarized in Table 13.

Per AFM analysis, coatings with a gap height of 1 mil (25.4 micrometers) exhibit near-isoporosity. At higher gap heights, non-isoporous structures are seen.

TABLE 13

| Example | Gap Height (mil/micrometers) | Appearance by AFM |
|---|---|---|
| EX 23 | 1/25.4 | Near-isoporous |
| EX 24 | 1.5/38.1 | Not isoporous |
| EX 25 | 2/50.8 | Not isoporous |
| EX 26 | 2.5/63.5 | Not isoporous |
| EX 27 | 3/76.2 | Not isoporous |
| EX 28 | 3.5/88.9 | Not isoporous |
| EX 29 | 4/101.6 | Not isoporous |
| EX 30 | 4.5/114.3 | Not isoporous |
| EX 31 | 5/127 | Not isoporous |
| EX 32 | 5.5/139.7 | Not isoporous |
| EX 33 | 6/152.4 | Not isoporous |

PSISP Thin Film Composite Membranes from DMA/THF

PSISP block copolymer from PE 16 was dissolved at a concentration of 16 wt % in a solution of 60/40 (w/w) DMA/THF. Samples were coated onto "PAN350" using an anti-sag meter with coating gap heights ranging from 1 to 6 mil (25.4 to 152.4 micrometers) in 0.5 mil (12.7 micrometer) increments. The coated film was immediately immersed in water to remove residual solvent. Conditions and results are summarized in Table 14. At gap heights from 1 to 3 mil, the coatings appear isoporous or near isoporous. At gap heights greater than or equal to 3.5 mil, coatings range from near isoporous to having a wide distribution of pore sizes.

TABLE 14

| Example | Gap Height (mil/micrometers) | Appearance by AFM |
|---|---|---|
| EX 34 | 1/25.4 | Near isoporous |
| EX 35 | 1.5/38.1 | Near isoporous |
| EX 36 | 2/50.8 | Near isoporous |
| EX 37 | 2.5/63.5 | Near isoporous |
| EX 38 | 3/76.2 | Near isoporous |
| EX 39 | 3.5/88.9 | Porous, but low pore density |
| EX 40 | 4/101.6 | Near isoporous but low pore density |
| EX 41 | 4.5/114.3 | Near isoporous but low pore density |
| EX 42 | 5/127 | Wide distribution of pore sizes |
| EX 43 | 5.5/139.7 | Wide distribution of pore sizes |
| EX 44 | 6/152.4 | Wide distribution of pore sizes |

PSISP Coated from Different Solvents, Coating Concentrations and Gap Heights

PSISP block copolymer from PE 18 was dissolved at 1.5-6 wt % in a solvent mixture of 60/40 w/w DMA/THF. Samples were coated onto "PAN350" using a multiple clearance square applicator at gap heights of 0.5 or 1 mil (12.7 or 25.4 micrometers), and the coatings were immediately immersed in water to remove residual solvent. Conditions and results are summarized in Table 15. At concentrations of 4 wt % or greater dissolved polymer, no flux was observed. At lower concentrations, flux was observed, with higher fluxes seen at lower coating concentrations.

TABLE 15

| Example | Concentration (wt %) | Gap Height (mil/ micrometers) | Flux (LMH/bar) | Appearance by Microscopy |
|---|---|---|---|---|
| EX 45 | 6 | 1/25.4 | 0 | Not tested |
| EX 46 | 5 | 1.5/38.1 | 0 | Not tested |
| EX 47 | 4 | 2/50.8 | 0 | Not tested |
| EX 48 | 3 | 2.5/63.5 | 5 | Not tested |
| EX 49 | 3 | 3/76.2 | 7.2 | Isoporous (AFM) |
| EX 50 | 2.5 | 3.5/88.9 | 9 | Isoporous regions (SEM) |
| EX 51 | 2.5 | 4/101.6 | 7.2 | Isoporous (AFM) |
| EX 52 | 2 | 4.5/114.3 | 11.4 | Isoporous (AFM) |
| EX 53 | 1.75 | 5/127 | 22 | Not tested |
| EX 54 | 1.5 | 5.5/139.7 | 77 | Not tested |
| EX 55 | 1.5 | 6/152.4 | 67 | Mix of circular and elongated pores (AFM); Conformal regions (SEM) |

PSISP block copolymer from PE 18 was dissolved at 1.5-5 wt % in a solvent mixture of 90/10 w/w NMP/THF. Samples were coated onto "PAN350" using a multiple clearance square applicator at 0.5 mil (12.7 micrometers) gap height, and the coatings were immediately immersed in water to remove residual solvent. Conditions and results are summarized in Table 16. Very low flux (4 LMH/bar) was observed at 5 wt %. At lower concentrations, higher fluxes were observed, with at least 70 LMH/bar seen at 1.5 wt %.

TABLE 16

| Example | Concentration (wt %) | Flux (LMH/bar) | Appearance by AFM |
|---|---|---|---|
| EX 56 | 5 | 4.3 | Not tested |
| EX 57 | 4 | 13.2 | Not tested |
| EX 58 | 3 | 23.7 | Not tested |
| EX 59 | 2.5 | 32.6 | Not tested |
| EX 60 | 1.5 | 72.8 | Near isoporous |

PSISP block copolymer from PE 18 was dissolved at 1.5-5.5 wt % in a solvent mixture of 90/10 w/w acetone/THF. Samples were coated onto "PV400" using a multiple clearance square applicator at 0.5 mil (12.7 micrometers) gap height, and the coatings were immediately immersed in water to remove residual solvent. Results are summarized in Table 17. Fluxes were observed over all coating concentrations, ranging from 70 LMH/bar at 5.5 wt % to 280 LMH/bar at 1.5 wt %.

TABLE 17

| Example | Concentration (wt %) | Flux (LMH/bar) |
|---|---|---|
| EX 61 | 1.5 | 280 |
| EX 62 | 2 | 227 |
| EX 63 | 2.5 | 218 |
| EX 64 | 3 | 168 |
| EX 65 | 3.5 | 141 |
| EX 66 | 4.5 | 80 |
| EX 67 | 5.5 | 70 |

PSISP Thin Composite Membranes from Different NMP/MEK Solvent Ratios

PSISP block copolymer from PE 18 was dissolved at 1.5 wt % in solvent mixtures of NMP/MEK at ratios ranging from 40/60 to 80/20 w/w. Samples were coated on "PAN350" using a multiple clearance square applicator at 0.5 mil (12.7 micrometers) gap height, and the coatings were immediately immersed in water to remove residual solvent. Conditions and results are summarized in Table 18. At 40/60 to 60/40 w/w NMP/MEK, the sample appeared the same as uncoated "PAN350" substrate, suggesting conformal coating. For NMP content from 65-100 wt %, an isoporous coating was seen. Flux was observed to significantly decline from that of uncoated PAN350 once a non-conformal coating was reached.

DLS was performed at 0.1 wt % of PSISP block copolymer from PE 18 in a subset of these solvent ratios. Results are also listed in Table 18. Significant populations of free chains and micelles were observed at 50/50 and 60/40 NMP/MEK. For 70/30 and 80/20 NMP/MEK, the intensity of the size distribution signal was significantly higher in the micelle size range, with a lower intensity signal from free chains. This reduction in free chain contribution coincides with the shift in coating appearance from conformal to isoporous. At 100% NMP, only the micelle signal could be seen.

TABLE 18

| Example | NMP/MEK Ratio (w/w) | Flux (LMH/bar) | Appearance by AFM | DLS* |
|---|---|---|---|---|
| EX 68 | 40/60 | 450 | Conformal | Not tested |
| EX 69 | 50/50 | 257 | Conformal | FM |
| EX 70 | 60/40 | 134 | Conformal | FM |
| EX 71 | 65/35 | 31 | Isoporous | fM |
| EX 72 | 70/30 | 44 | Isoporous | fM |
| EX 73 | 80/20 | 41 | Isoporous | Not tested |
| EX 74 | 100/0 | 31 | Isoporous | M |

*F and f: Free chain (peak at 5-20 nm), M: Micelles (peak at 40-200 nm); when a form has a signal intensity within plus or minus 20% of another form, each form is shown in upper case, whereas when a form has a signal intensity outside that range, the form having the higher intensity signal is shown in upper case and the form having the lower intensity signal is shown in lower case PSISP Thin Composite Membranes from Different DMA/THF Solvent Ratios PSISP block copolymer from PE 18 was dissolved at 1.5 wt % in solvent mixtures of DMA/THF at ratios ranging from 40/60 to 60/40 w/w. Samples were coated on "PAN350" using a multiple clearance square applicator at 0.5 mil (12.7 micrometers) gap height and the coatings were immediately immersed in water to remove residual solvent. Conditions and results are summarized in Table 19. At 40/60 w/w DMA/THF, the sample appeared the same as uncoated "PAN350" substrate, suggesting conformal coating. For 60/40 w/w DMA/THF, an isoporous coating was seen. Flux was observed to significantly decline from that of uncoated PAN350 once a non-conformal coating was reached. DLS was performed at 0.1 wt % of PSISP block copolymer from PE 18 at 60/40 w/w DMA/THF. Significant populations of free chains (5-10 nm) and micelles (200-600 nm) were observed.

TABLE 19

| Example | DMA/THF Ratio (w/w) | Flux (LMH/bar) | Appearance by AFM |
|---|---|---|---|
| EX 75 | 40/60 | 500 | Conformal |
| EX 76 | 50/50 | 330 | Not tested |
| EX 77 | 60/40 | 40 | Isoporous |

Figure 1B:
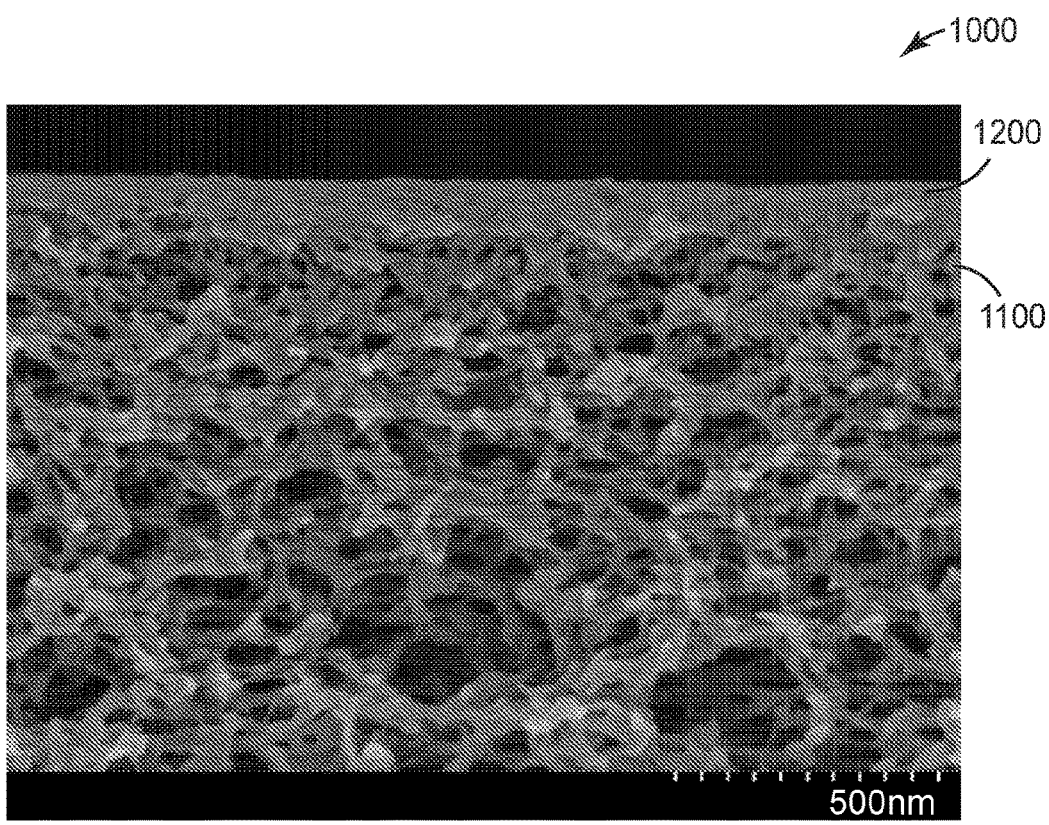
FIG. 1B is an SEM image at a magnification of 70,000× of a cross-section of the article of EX 77.

SEM surface and cross-sectional imaging was conducted on the 60/40 DMA/THF sample (FIGS. 1A and 1B, respectively). Isoporous features were observed on the surface, while the cross-sectional image showed a very thin porous layer (approximately 50 nm) was formed at the very surface of the substrate. Beneath that layer, the cross section appears to be the same as that of uncoated "PAN350".

PSISP Thin Composite Membranes from Different DMF/THF Solvent Ratios

PSISP block copolymer from PE 18 was dissolved at 1.5 wt % in solvent mixtures of DMF/THF at ratios ranging from 40/60 to 65/35 w/w. Samples were coated on "PAN350" using a multiple clearance square applicator at 0.5 mil (12.7 micrometers) gap height and the coatings were immediately immersed in water to remove residual solvent. Conditions and results are summarized in Table 20. At 40/60 w/w DMF/THF, the sample appeared the same as uncoated "PAN350" substrate, suggesting conformal coating. At 50/50 w/w DMF/THF, a porous coating with irregular self-assembled pores could be seen. For greater than 60 wt % DMF, an isoporous coating was seen. Flux was observed to significantly decline from that of uncoated "PAN350" once a non-conformal coating was reached.

TABLE 20

| Example | DMF/THF Ratio (w/w) | Flux (LMH/bar) | Appearance by AFM |
|---|---|---|---|
| EX 78 | 40/60 | 117 | Conformal |
| EX 79 | 50/50 | 17 | Irregular pores |
| EX 80 | 60/40 | 11 | Isoporous |
| EX 81 | 65/35 | 31 | Isoporous |

PSISP Thin Composite Membranes from Different NMP/THF Solvent Ratios

PSISP block copolymer from PE 18 was dissolved at 1.5 wt % in solvent mixtures of NMP/THF at ratios ranging from 70/30 to 100/0 w/w. Samples were coated on "PAN350" substrate using a multiple clearance square applicator at 0.5 mil (12.7 micrometers) gap height and the coatings were immediately immersed in water to remove residual solvent. Conditions and results are summarized in Table N. At less than or equal to 80 wt % NMP, the sample appeared the same as uncoated "PAN350" substrate, suggesting conformal coating. For NMP content greater than 90 wt %, an isoporous coating was seen. Flux was observed to significantly decline from that of uncoated "PAN350" once a non-conformal coating was reached.

DLS was performed at 0.1 wt % of PSISP-212 in a subset of these solvent ratios. Results are also listed in Table 21. At 70/30 w/w NMP/THF, most of the size distribution signal was in the micelle size range, with a minority contribution from free chains. At greater than 80 wt % NMP, only the micelle signal could be seen.

TABLE 21

| Example | NMP/THF Ratio (w/w) | Flux (LMH/bar) | Appearance by AFM | DLS* |
|---|---|---|---|---|
| EX 82 | 70/30 | 386 | Conformal | fM |
| EX 83 | 80/20 | 426 | Conformal | M |
| EX 84 | 90/10 | 73 | Isoporous | M |
| EX 85 | 100/0 | 31 | Isoporous | M |

*F and f: Free chain (peak at 5-20 nm), M: Micelles (peak at 40-200 nm), Upper case and lower case are as indicated for Table 18 above.

PSISP Thin Composite Membranes from Different Hexane/THF Solvent Ratios

PSISP block copolymer from PE 18 was dissolved at 1.5 wt % in solvent mixtures of hexane/THF at ratios ranging from 70/30 to 100/0 w/w. Samples were coated on "PAN350" substrate using a multiple clearance square applicator at 0.5 mil (12.7 micrometers) gap height and the coatings were immediately immersed in water to remove residual solvent. Conditions and results are summarized in Table 22. At 60/40 w/w hexane/THF, the sample appeared the same as uncoated "PAN350" substrate, suggesting conformal coating. For hexane content greater than 70 wt %, a coating with wormlike structures was seen. Flux was observed to significantly decline from that of uncoated "PAN350" once a non-conformal coating was reached.

TABLE 22

| Example | Hexane/THF Ratio (w/w) | Flux (LMH/bar) | Appearance by AFM |
|---|---|---|---|
| EX 86 | 60/40 | 336 | Conformal |
| EX 87 | 70/30 | 28 | Wormlike |
| EX 88 | 80/20 | 2.2 | Wormlike |

PSISP Thin Composite Membranes from Different Acetone/THF Solvent Ratios

Figure 2A:
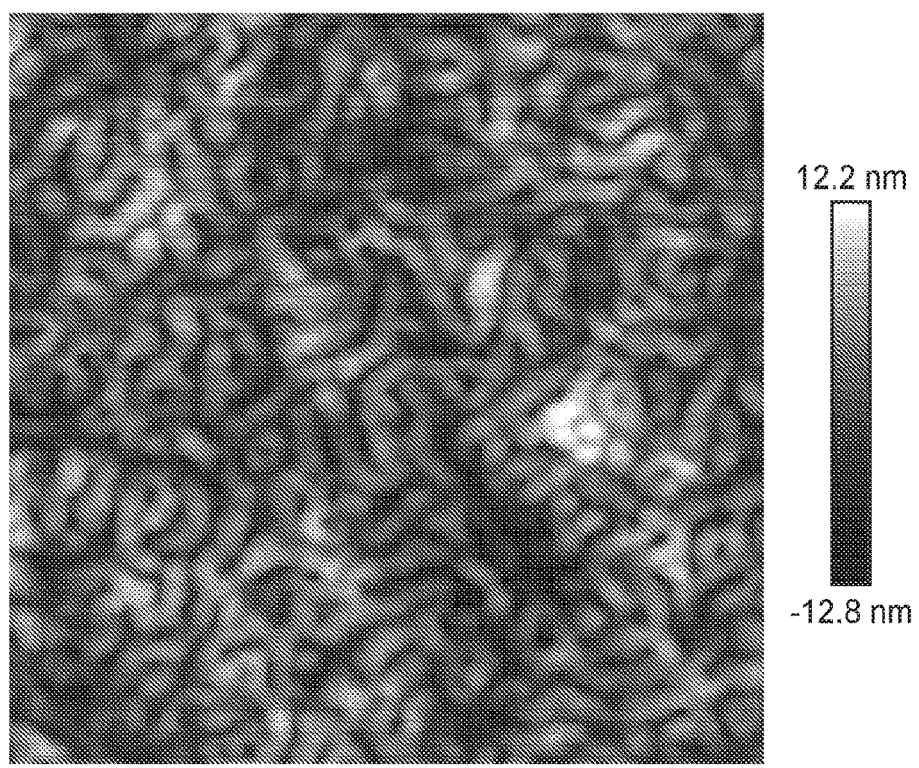
FIG. 2A is an atomic force microscope (AFM) topography image of a surface of the article of EX 90.
Figure 2B:
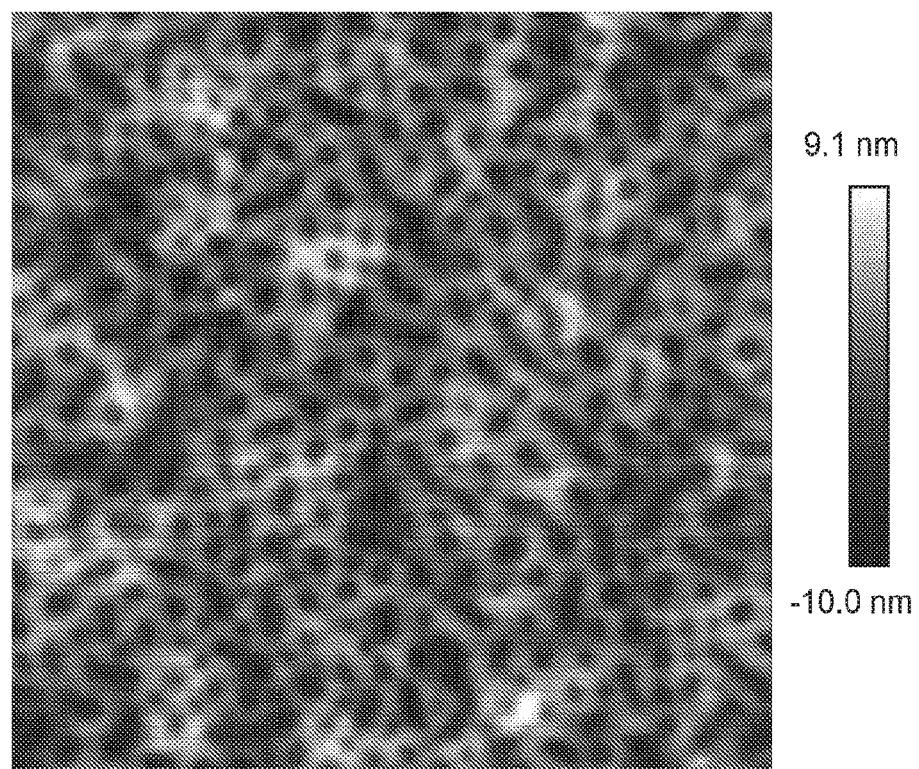
FIG. 2B is an AFM topography image of a surface of the article of EX 93.
Figure 5A:
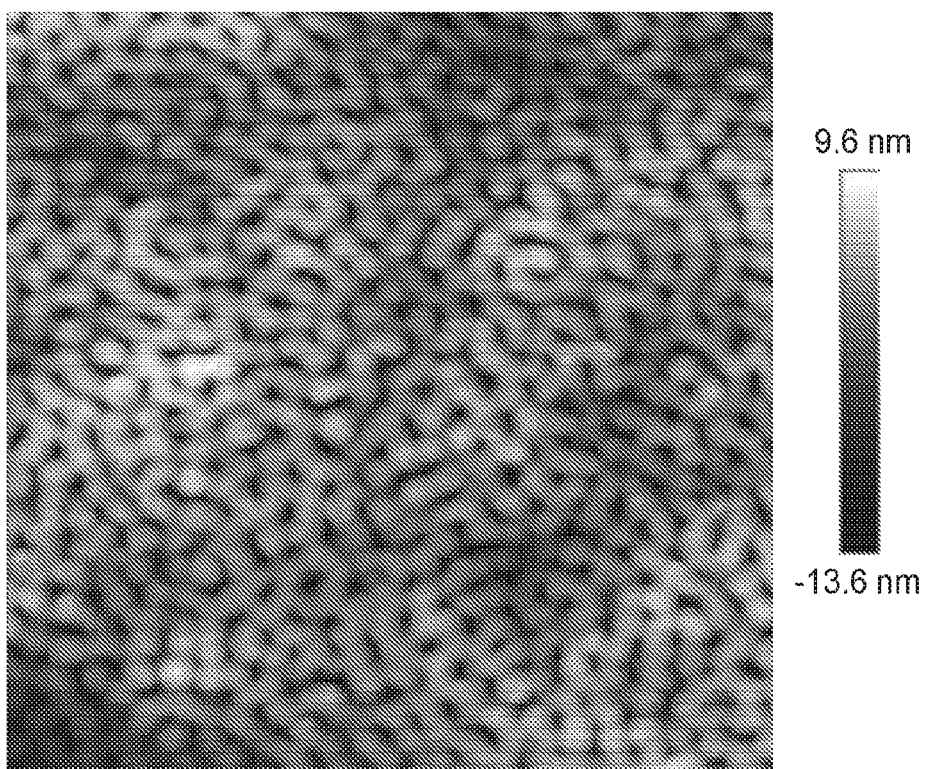
FIG. 5A is an AFM height image of a surface of the article of EX 150.
Figure 5B:
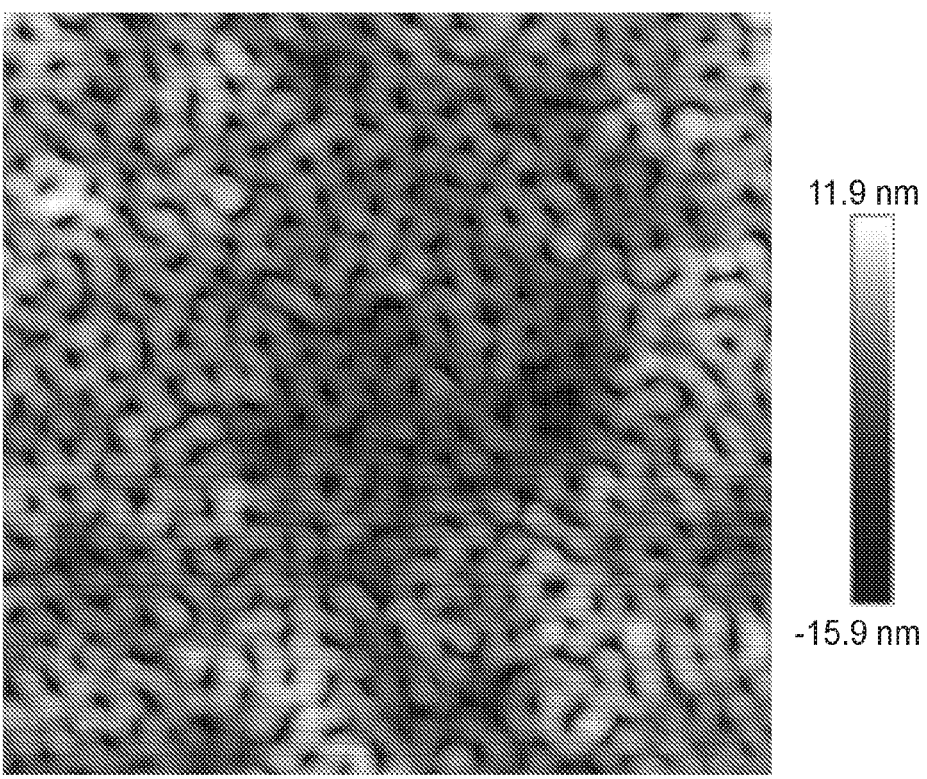
FIG. 5B is an AFM height image of a surface of the article of EX 151.

PSISP block copolymer from PE 18 was dissolved at 1.5 wt % in solvent mixtures of acetone/THF at ratios ranging from 60/40 to 90/10 w/w. Samples were coated on "PAN350" substrate using a multiple clearance square applicator at 0.5 mil (12.7 micrometers) gap height, and then the coatings were air dried in a fume hood. Conditions and results are summarized in Table P. At 60/40 to 70/30 w/w acetone/THF, a coating with approximately 30 nm wormlike features appears at the surface (e.g., FIG. 2A shows a surface of EX 90). At 80/20 w/w acetone/THF, a mixture of circular and elongated pores was seen. For greater than 85 wt % acetone, a near-isoporous coating was seen, with a minority population of elongated pores (e.g., FIG. 2B shows a surface of EX 93). Flux was observed to be significantly lower than that of uncoated "PAN350".

DLS was performed at 0.1 wt % of PSISP block copolymer from PE 18 in a subset of these solvent ratios. Results are also listed in Table 23. Only free chains were observed at 70/30 w/w acetone/MEK. At 80/20 w/w acetone/MEK, most of the size distribution signal was in the micelle size range, with a minority contribution from free chains. This reduction in free chain contribution coincides with the shift in coating appearance from a significant population of elongated pores to circular pores being the majority. At greater than 85% acetone, only the micelle signal could be seen.

TABLE 23

| Example | Acetone/THF Ratio (w/w) | Flux (LMH/bar) | Appearance by AFM | DLS* |
|---|---|---|---|---|
| EX 89 | 60/40 | 41 | Wormlike | |
| EX 90 | 70/30 | 12 | Wormlike | F |
| EX 91 | 80/20 | 8 | Some elongated pores | fM |
| EX 92 | 85/15 | 4.8 | Near-isoporous | M |
| EX 93 | 90/10 | 4.1 | Near-isoporous | M |

*F and f: Free chain (peak at 10-30 nm), M: Micelles (peak at 40-200 nm), Upper case and lower case are as indicated for Table 18 above.

OSISO Thin Composite Membranes from Different Acetone/THF Solvent Ratios

OSISO block copolymer from PE 21 was dissolved at 1.5 wt % in solvent mixtures of acetone/THF at ratios ranging from 60/40 to 90/10 w/w. Samples were coated on "PAN350" substrate using a multiple clearance square applicator at 0.5 mil (12.7 micrometers) gap height and then the coatings were air dried in a fume hood. Conditions and results are summarized in Table 24. At 60/40 w/w acetone/THF, the sample appeared the same as uncoated "PAN350" substrate, suggesting conformal coating. With increasing acetone content up to 80 wt %, an isoporous coating was seen (e.g., FIG. 3A shows a surface of EX 96). With acetone content 85 wt % and greater, it appeared that the micelles in the solution are no longer fully fusing during the drying process, giving the appearance of approximately 50 to 80 nm annular objects at the coating surface (e.g., FIG. 3B shows a surface of EX 100). Flux was much lower than that of uncoated "PAN350" for the isoporous and annular object coatings.

DLS was performed at 0.1 wt % of OSISO block copolymer from PE 21 in a subset of these solvent ratios. Results are also listed in Table 24. A mixture of free chains and micelles were observed at 50/50 w/w acetone/THF. At 75/25 w/w acetone/THF, only micelles were observed. This reduction in free chain contribution coincides with the shift in coating appearance from conformal to isoporous. At 90 wt % acetone, there was significant aggregate component in the solution.

TABLE 24

| Example | Acetone/THF Ratio (w/w) | Concentration (wt %) | Gap Height (mil/micrometers) | Flux (LMH/bar) | Appearance by AFM | DLS* |
|---|---|---|---|---|---|---|
| EX 94 | 50/50 | 0.1 | N/A | N/A | N/A | FM |
| EX 95 | 60/40 | 1.5 | 0.5/12.7 | Not tested | Conformally coated PAN350 | Not tested |
| EX 96 | 70/30 | 1.5 | 0.5/12.7 | 19 | Isoporous | Not tested |
| EX 97 | 75/25 | 1.5 | 0.5/12.7 | Not tested | Isoporous | M |
| EX 98 | 80/20 | 1.5 | 0.5/12.7 | 14 | Isoporous | Not tested |
| EX 99 | 85/15 | 1.5 | 0.5/12.7 | Not tested | Some isoporosity and some partially fused annular objects | Not tested |
| EX 100 | 90/10 | 1.5 | 0.5/12.7 | 27 | Largely unfused annular objects | A |

*A: aggregates or undissolved, F: Free chain (peak at 20-50 nm), M: Micelles (peak at 60-100 nm);
Upper case is as indicated for Table 18 above.

Comparative Examples: Casting of OSISO Materials Using SIPS

OSISO block copolymers from PE 21 and PE 23 were dissolved in various solvent mixtures at concentrations from 12-18 wt % and cast using a multiple clearance square applicator at a coating gap height of 8 mil (203.2 micrometers) with evaporation periods from 0-60 seconds prior to immersion in a water bath. Conditions and results are summarized in Table 25. A range of results were seen, including disintegration, gelation giving clear dry films, and a few opaque films with pore structures (e.g., membranes). Samples that did not disintegrate remained attached to the plastic coating support.

TABLE 25

| Comp. Example | Polymer | Solvent (w/w) | Concentration (wt %) | Evap. Time (s) | Comments | Appearance by AFM |
|---|---|---|---|---|---|---|
| CE 1 | PE 21 | 60/40 THF/DMF | 12 | 20 | Dried clear | Not tested |
| CE 2 | PE 21 | 60/40 THF/DMF | 12 | 40 | Dried clear | Not tested |
| CE 3 | PE 23 | 50/50 MeTHF/NMP | 18 | 0 | Opaque | Some pores |
| CE 4 | PE 23 | 50/50 MeTHF/NMP | 18 | 20 | Opaque/translucent | Not tested |
| CE 5 | PE 23 | 50/50 MeTHF/NMP | 18 | 40 | Dried clear | Not tested |
| CE 6 | PE 23 | 70/30 MeTHF/NMP | 18 | 10 | Opaque | Some pores |
| CE 7 | PE 23 | 70/30 MeTHF/NMP | 18 | 20 | Translucent | Open pore structure |
| CE 8 | PE 23 | 70/30 MeTHF/NMP | 18 | 40 | Translucent | Not tested |
| CE 9 | PE 23 | 70/30 MeTHF/NMP | 21 | 20 | Translucent | Wormlike structures |
| CE 10 | PE 23 | 70/30 MeTHF/NMP | 21 | 40 | Opaque | Wormlike structures |
| CE 11 | PE 23 | 70/30 MeTHF/NMP | 21 | 60 | Translucent | Not tested |
| CE 12 | PE 23 | 25/25/50 MeTHF/NMP | 18 | 0 | Opaque | Not tested |
| CE 13 | PE 23 | 25/25/50 MeTHF/NMP | 18 | 20 | Clear/translucent | Not tested |
| CE 14 | PE 23 | 25/25/50 MeTHF/NMP | 18 | 40 | Dried clear | Not tested |
| CE 15 | PE 23 | 50/38/12 MEK/DMAc/Sulfolane | 12 | 20 | Disintegrated | Not tested |

TABLE 25-continued

| Comp. Example | Polymer | Solvent (w/w) | Concentration (wt %) | Evap. Time (s) | Comments | Appearance by AFM |
|---|---|---|---|---|---|---|
| CE 16 | PE 23 | 50/38/12 MEK/DMAc/Sulfolane | 15 | 20 | Disintegrated | Not tested |
| CE 17 | PE 23 | 100/38/12 MEK/DMAc/Sulfolane | 15 | 20 | Disintegrated | Not tested |
| CE 18 | PE 23 | 150/38/12 MEEK/DMAc/Sulfolane | 15 | 20 | Disintegrated | Not tested |
| CE 19 | PE 23 | 200/38/12 MEK/DMAc/Sulfolane | 15 | 0 | Disintegrated | Not tested |
| CE 20 | PE 23 | 200/38/12 MEK/DMAc/Sulfolane | 15 | 20 | Disintegrated | Not tested |

Casting of OSISO Thin Film Composites

OSISO block copolymer from PE 22, PE 23, and PE 24 were dissolved at 1.5% in solvent mixtures of acetone/THF at ratios ranging from 50/50 to 90/10 w/w. Samples were coated on "PAN350" substrate using a multiple clearance square applicator at 1 mil (25.4 micrometers) gap height and then the coatings were air dried in a fume hood. Conditions and results are summarized in Table 26. In every series of solvents, a shift from conformal coating to a largely isoporous coating (e.g., FIG. 4A shows a surface of Sample 62) was observed with increasing acetone content by AFM. SEM of the same sample surface confirmed the presence of a mostly open isopore structures (FIG. 4B).

DLS was performed at 0.1 wt % of the OSISO materials at the same solvent ratios. Results are also listed in Table 26. Across every series, there was a shift in the solution character from predominantly free chain at higher acetone content to predominantly micelle at higher THF content.

Comparative Examples: Casting of OISIO Materials Using SIPS

OISIO pentablock copolymer from PE 8 was dissolved in various MEK/DMF and THF/DMF solvent mixtures at concentrations from 9-14 wt %. For the MEK/DMF system, it was found that the solutions either phase separated (12 and 14 wt %) or gelled (9-11 wt %). For the THF/DMF system, it was found that solutions with 50% or less THF gelled. Those at higher THF content and lower concentrations were cast using a multiple clearance square applicator at a coating gap height of 8 mil (203.2 micrometers) with evaporation periods from 5-15 seconds prior to immersion in a water bath. They formed translucent or clear cohesive films. Table 27 contains a summary of coating conditions used and results.

TABLE 27

| Comp. Example | Solvent (w/w) | Concentration (wt %) | Evap. Time (s) | Comments |
|---|---|---|---|---|
| CE 21 | 60/40 THF/DMF | 9 | 5 | Gelled/Translucent |
| CE 22 | 60/40 THF/DMF | 9 | 10 | Gelled/Translucent |
| CE 23 | 60/40 THF/DMF | 9 | 15 | Gelled/Translucent |
| CE 24 | 70/30 THF/DMF | 9 | 10 | Gelled/Translucent |

TABLE 26

| Example | Polymer | Acetone/THF Ratio (w/w) | Concentration (wt %) | Flux (LMH/bar) | Appearance by AFM | DLS** |
|---|---|---|---|---|---|---|
| EX 101 | PE 22 | 50/50 | 1.5 | 272.2 | Conformal | F |
| EX 102 | PE 22 | 75/25 | 1.5 | 7.6 | Isoporous with some closed pores | M |
| EX 103 | PE 22 | 90/10 | 1.5* | Not tested | Not tested | A |
| EX 104 | PE 23 | 50/50 | 1.5 | 1567 | Conformal | F |
| EX 105 | PE 23 | 75/25 | 1.5 | 382.0 | Conformal | M |
| EX 106 | PE 23 | 90/10 | 1.5 | 13.3 | Mostly elongated structures with some open isopores | M |
| EX 107 | PE 24 | 50/50 | 1.5 | 1429 | Conformal | F |
| EX 108 | PE 24 | 75/25 | 1.5 | 119 | Conformal | M |
| EX 109 | PE 24 | 90/10 | 1.5 | 11.4 | Isoporous with mostly closed pores | M |

*Solution was undissolved
**A: aggregates or undissolved, F: Free chain (peak at 10-30 nm), M: Micelles (peak at 40-100 nm).
Upper case is as indicated for Table 18 above.

Casting of OISIO Thin Film Composites

OISIO block copolymer from PE 8 was dissolved at 1.5 wt % in NMP or in solvent mixtures of DMF/THF, DMA/THF and acetone/THF at various ratios. Samples were coated onto "PAN350" using a multiple clearance square applicator at a coating gap height of 0.5 mil (12.7 micrometers) and the coatings were air dried in a fume hood (for acetone/THF) or immediately immersed in water to remove residual solvent (for NMP, DMF/THF, and DMA/THF). Conditions and results are summarized in Table 28. Isoporous or near isoporous structures with some elongated pores were seen by AFM for the DMF/THF and DMA/THF ratios that were tried. In NMP and the acetone/THF ratios which were tried, micellar or lamellar type structures were seen. Moderate flux was observed in the DMF/THF, DMA/THF and acetone/THF systems while higher flux was seen in the NMP system. In the DLS results of OISIO-61 in 70/30 w/w DMF/THF, only a micelle peak was seen. DLS observations for a dilute solution of OISIO-61 in 70/30 DMF/THF are also reported in Table 28.

TABLE 28

| Example | Solvent Ratio (w/w) | Flux (LMH/bar) | Appearance by AFM | DLS Results* |
|---|---|---|---|---|
| EX 110 | 70/30 DMF/THF | 38 | Near isoporous | M |
| EX 111 | 80/20 DMA/THF | 44 | Largely isoporous | Not tested |
| EX 112 | 90/10 DMA/THF | 64 | Isoporous | Not tested |
| EX 113 | NMP | 253 | Micellar | Not tested |
| EX 114 | 90/10 Actn/THF | 54 | Nodular lamellae | Not tested |
| EX 115 | 80/20 Actn/THF | 28 | Spherical micelles | Not tested |

*M: Micelles (peak at 40-200 nm).

Casting of ISP Thin Film Composites

ISP block copolymer from PE 2 was dissolved at 1.5 wt % in NMP or in solvent mixtures of 90/10 acetone/THF or 80/20 NMP/THF. Samples were coated onto "PAN350" using a multiple clearance square applicator at a coating gap height of 0.5 mil (12.7 micrometers) and the coatings were air dried in a fume hood (for acetone/THF) or immediately immersed in water to remove residual solvent (for NMP and 80/20 NMP/THF). Conditions and results are summarized in Table 29. Near isoporous structures, with more variable pore shape and size, were seen for NMP and 90/10 acetone/THF. Isoporosity was seen in the 80/20 NMP/THF system. Moderate fluxes, much lower than that of uncoated substrate, were observed in all systems.

TABLE 29

| Example | Solvent Ratio | Flux (LMH/bar) | Appearance by AFM |
|---|---|---|---|
| EX 116 | NMP | 41 | Near isoporous |
| EX 117 | 90/10 Actn/THF | 24 | Near isoporous |
| EX 118 | 80/20 NMP/THF | 56 | Isoporous |

Comparative Examples: Casting of SIP Materials Using SIPS at 16 wt %

SIP block copolymer from PE 5 was dissolved in solvent mixtures of 50/50 w/w THF/DMAc and 70/30 w/w MEK/NMP at a concentration of 16 wt % and cast at 8 mil (203.2 micrometers) with evaporation periods from 10-25 seconds. Samples were then immersed in water to remove residual solvent. The coatings became opaque and remained attached to the plastic support sheet while in the bath. Following removal from the water bath and drying, samples were examined by AFM to assess the surface morphology. Coating conditions and results are summarized in Table 30. Neither nanoscale dot features nor isopores were seen in the coatings.

TABLE 30

| Comp. Example | Solvent (w/w) | Evap. Time (s) | Appearance by AFM |
|---|---|---|---|
| CE 25 | 50/50 THF/DMAc | 10 | Large features |
| CE 26 | 50/50 THF/DMAc | 15 | Large features |
| CE 27 | 50/50 THF/DMAc | 20 | Large features |
| CE 28 | 50/50 THF/DMAc | 25 | Large features |
| CE 29 | 70/30 MEK/NMP | 10 | 50 nm wormlike features |
| CE 30 | 70/30 MEK/NMP | 15 | 50 nm wormlike features |
| CE 31 | 70/30 MEK/NMP | 20 | 50 nm wormlike features |
| CE 32 | 70/30 MEK/NMP | 25 | 50 nm wormlike features |

Casting of SIP Thin Film Composites at 16 wt %

SIP block copolymer from PE 5 was dissolved in solvent mixtures of 50/50 w/w THF/DMAc and 70/30 w/w MEK/NMP at a concentration of 16 wt % and cast onto "PAN350" using a multiple clearance square applicator at a coating gap height of 2 mil (50.8 micrometers) with evaporation periods of 10 seconds. Samples were then immersed in water to remove residual solvent. Coating conditions and results are summarized in Table 31. Isoporous or near isoporous features were seen in the coatings.

TABLE 31

| Example | Solvents (w/w) | Appearance by AFM |
|---|---|---|
| EX 119 | 50/50 THF/DMA | Near isoporous |
| EX 120 | 70/30 MEK/NMP | Isoporous |

Casting of SIP Thin Film Composites at 6 wt %

SIP block copolymer from PE 6 was dissolved in solvent mixtures of 50/50 w/w THF/DMA and 70/30 w/w MEK/NMP at a concentration of 6 wt % and cast onto "PAN350" using a multiple clearance square applicator at a coating gap height of 1-6 mil (25.4 to 152.4 micrometers). After 10 seconds of evaporation, samples were then immersed in water to remove residual solvent. Coating conditions and results are summarized in Table 32. For the 50/50 w/w THF/DMA series, isoporous features were seen in the coatings up to 3 mil (76.2 micrometers), after which the surface changed to sparser nanoscale pore features. For the 70/30 w/w MEK/NMP series, isoporous features were seen around 2 mil (50.8 micrometers) thickness. At lower thicknesses, conformal coatings were observed, while at higher thicknesses, a mix of isopores and larger dots were seen.

TABLE 32

| Example | Solvents (w/w) | Gap Height (mil/micrometers) | Appearance by AFM |
|---|---|---|---|
| EX 121 | 50/50 THF/DMA | 1/25.4 | Isoporous with mostly closed pores |
| EX 122 | 50/50 THF/DMA | 1.5/38.1 | Isoporous with mostly closed pores |

TABLE 32-continued

| Example | Solvents (w/w) | Gap Height (mil/micrometers) | Appearance by AFM |
|---|---|---|---|
| EX 123 | 50/50 THF/DMA | 2/50.8 | Isoporous with mostly closed pores |
| EX 124 | 50/50 THF/DMA | 2.5/63.5 | Isoporous with mostly closed pores |
| EX 125 | 50/50 THF/DMA | 3/76.2 | Isoporous with mostly closed pores |
| EX 126 | 50/50 THF/DMA | 3.5/88.9 | Sparse nanoscale pores |
| EX 127 | 50/50 THF/DMA | 4/101.6 | Sparse nanoscale pores |
| EX 128 | 50/50 THF/DMA | 4.5/114.3 | Sparse nanoscale pores |
| EX 129 | 50/50 THF/DMA | 5/127 | Sparse nanoscale pores |
| EX 130 | 50/50 THF/DMA | 5.5/139.7 | Spherical and elongated pores |
| EX 131 | 50/50 THF/DMA | 6/152.4 | Spherical and elongated pores |
| EX 132 | 70/30 MEK/NMP | 1/25.4 | Conformal |
| EX 133 | 70/30 MEK/NMP | 1.5/38.1 | Conformal |
| EX 134 | 70/30 MEK/NMP | 2/50.8 | Isoporous |
| EX 135 | 70/30 MEK/NMP | 2.5/63.5 | Isoporous with larger pores |
| EX 136 | 70/30 MEK/NMP | 3/76.2 | Isoporous with larger pores |
| EX 137 | 70/30 MEK/NMP | 3.5/88.9 | Isoporous with larger pores |
| EX 138 | 70/30 MEK/NMP | 4/101.6 | Larger features |
| EX 139 | 70/30 MEK/NMP | 4.5/114.3 | Larger features |
| EX 140 | 70/30 MEK/NMP | 5/127 | Larger features |
| EX 141 | 70/30 MEK/NMP | 5.5/139.7 | Larger features |
| EX 142 | 70/30 MEK/NMP | 6/152.4 | Larger features |

Casting of VSISV Thin Film Composites

VSISV block copolymers from PE 27, PE 28, and PE 29 were dissolved at 2 wt % in solvent mixtures of diglyme/dioxane/THF and cast onto "PAN350" using a multiple clearance square applicator at a coating gap height of 0.5 mil (12.7 micrometers). Samples were immediately immersed in water to remove residual solvent. Coating conditions and results are summarized in Table 33.

DLS was performed at 0.1 wt % of the VSISV materials at the same solvent ratios. In the DLS results for all solvent mixtures, a significant contribution from both free chain and micelles was observed. In two cases (EX 148 and EX 150), VSISV in 38/32/30 and 18/32/50 w/w/w, an aggregate peak at 200-300 nm was also observed. The presence of micelles translated into the AFM structures, where many coatings appeared as small coalesced micelles. However, isoporous structures were seen in two of the VSISV coatings, at 18/32/50 (e.g., FIG. 5A shows a surface of EX 146) and 8/32/60 w/w/w (e.g., FIG. 5B shows a surface of EX 147).

TABLE 33

| Example | Polymer | Solvent Ratio (w/w/w Dg/Dx/THF) | Flux (LMH/bar) | Appearance by AFM | DLS Results* |
|---|---|---|---|---|---|
| EX 143 | PE 27 | 38/32/30 | Less than 1 | Coalesced micelles | FM |
| EX 144 | PE 28 | 38/32/30 | Less than 1 | Coalesced micelles with some nanoscale porous features | FM |
| EX 145 | PE 28 | 28/32/40 | 34 | Coalesced micelles with nanoscale porous features | FM |
| EX 146 | PE 28 | 18/32/50 | 98 | Coalesced micelles with nanoscale porous features | FM |
| EX 147 | PE 28 | 8/32/60 | 101 | Coalesced micelles with mostly rounded nanoscale porous features | FM |
| EX 148 | PE 29 | 38/32/30 | Less than 1 | Porous structure with mix of isopores and elongated pores | FMA |
| EX 149 | PE 29 | 28/32/40 | Less than 1 | Fused nanoscale annular objects | FM |
| EX 150 | PE 29 | 18/32/50 | Less than 1 | Isoporous structure | FMA |
| EX 151 | PE 29 | 8/32/60 | 9 | Isoporous structure | FM |

*F: Free chain (peak at 10-20 nm), M: Micelles (peak at 50-200 nm), A: Aggregates (greater than 200 nm). Upper case is as indicated for Table 18 above.

Casting of ISB Thin Film Composites

ISB block copolymer from PE 26 was dissolved at 2 wt % in solvent mixtures of 50/50 w/w acetone/THF and 50/50 w/w NMP/MEK and cast onto "PAN350" using a multiple clearance square applicator at a coating gap height of 0.5 mil (12.7 micrometers). The acetone/THF sample was air dried while the NMP/MEK sample was immediately immersed in water to remove residual solvent. Coating conditions and results are summarized in Table 34. Under AFM, the 50/50 w/w acetone/THF sample appeared to be conformally coated while the 50/50 w/w NMP/MEK sample appeared isoporous. DLS examination of dilute solutions of ISB-239 in the same solvent ratio showed a majority of free chain contribution in the acetone/THF case, while the NMP/MEK case showed majority micelle contribution.

TABLE 34

| Example | Solvent Ratio (w/w) | Flux (LMH/bar) | Appearance by AFM | DLS* |
|---|---|---|---|---|
| EX 152 | 50/50 Actn/THF | 57 | Conformal | Fma |
| EX 153 | 50/50 NMP/MEK | 15 | Isoporous | fM |

*F and f: Free chain (peak at 10-40 nm), M and m: Micelles (peak at 60-200 nm), a: Aggregates (peak at 400-2000 nm), Upper case and lower case are as indicated for Table 18 above.

Continuous Deposition by Slot Die of Thin Film Composites

Figure 6:
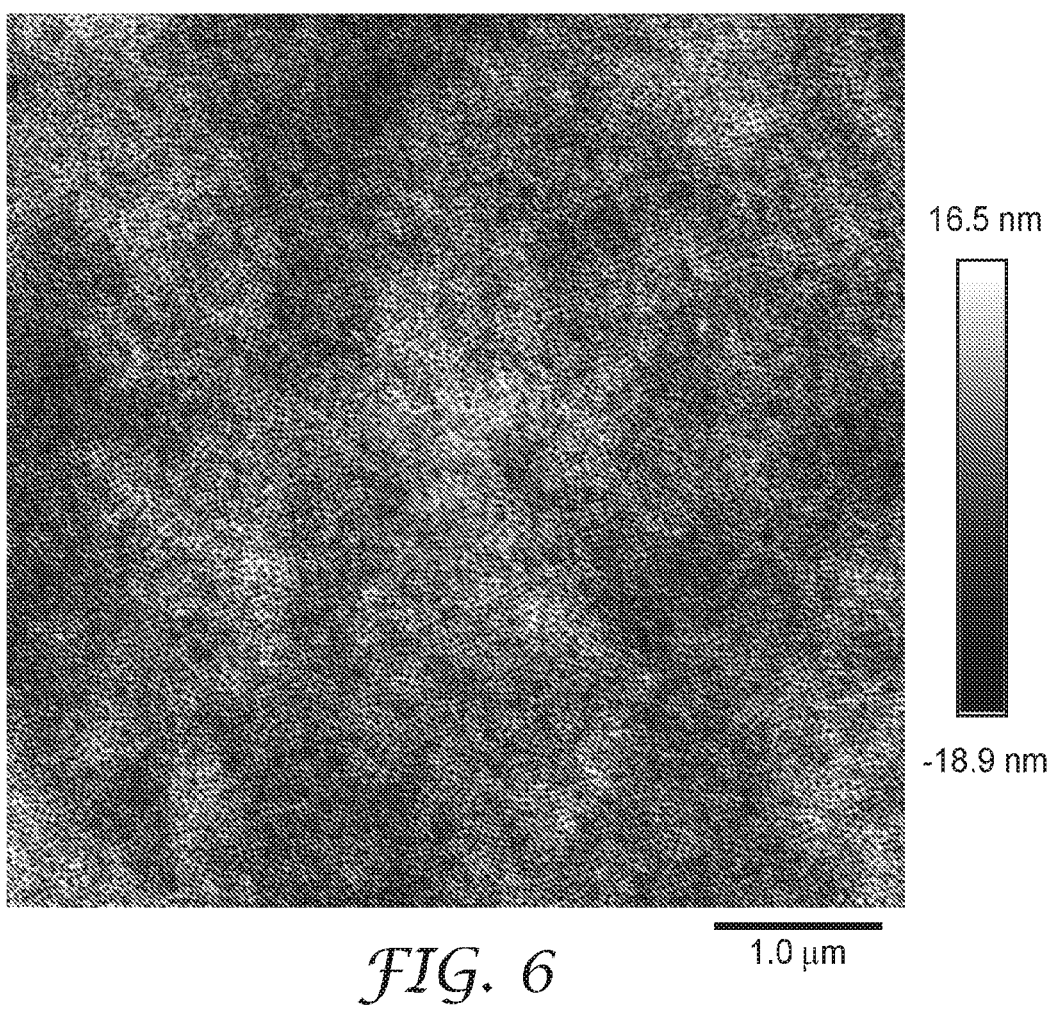
FIG. 6 is an AFM height image of a surface of the article of EX 154.
Figure 7:
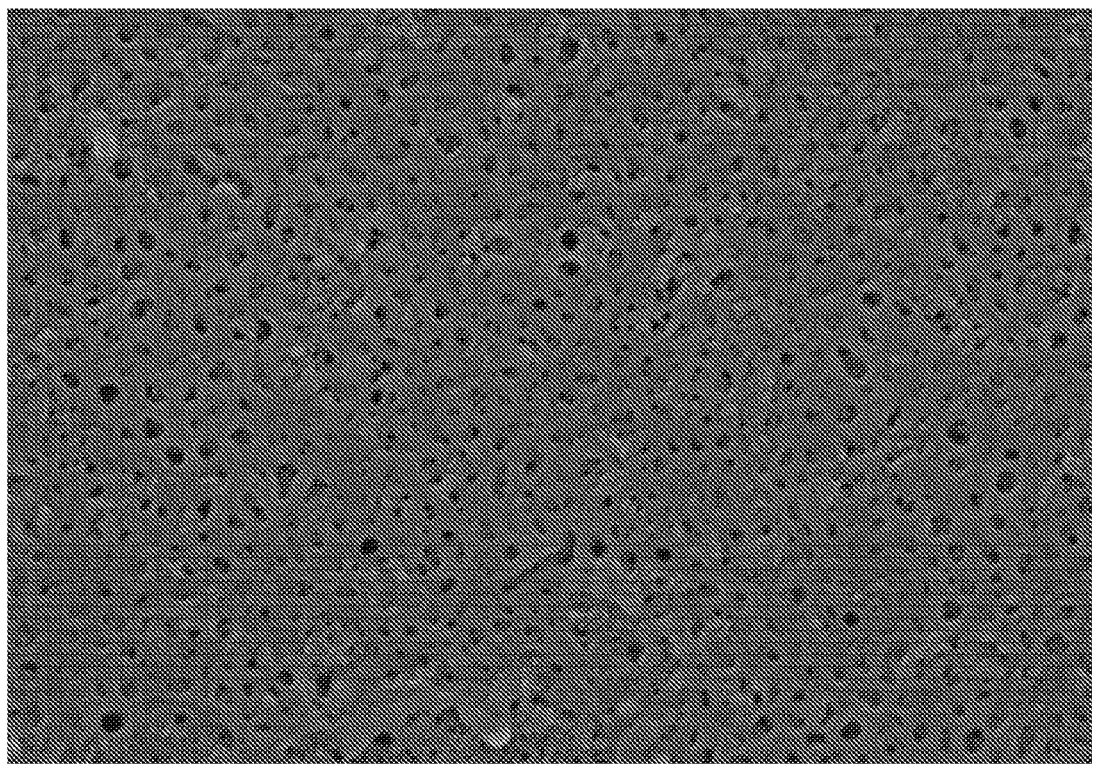
FIG. 7 is an SEM image at a magnification of 70,000× of a surface of the article of EX 155.
Figure 8:
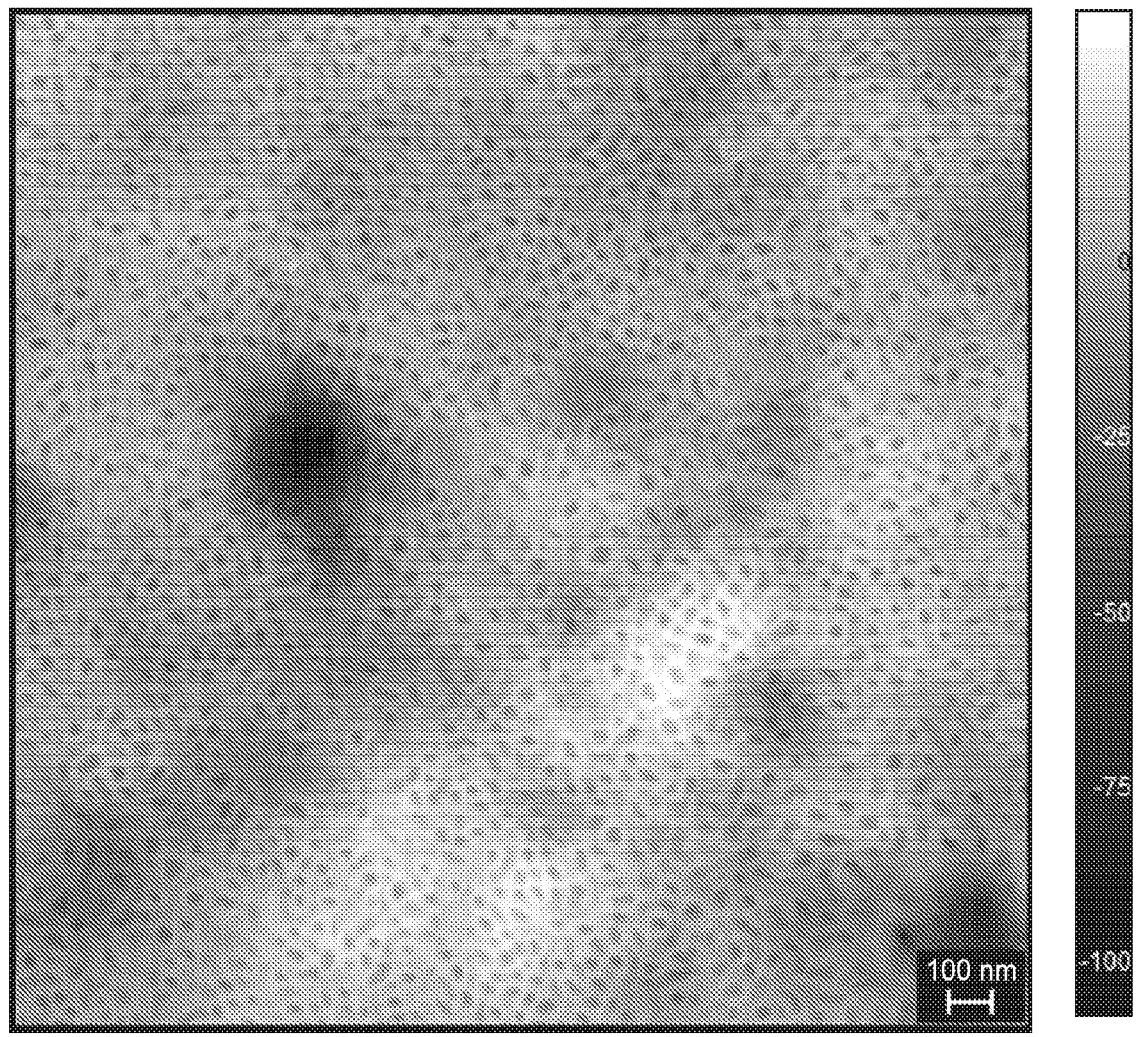
FIG. 8 is an AFM height image of a surface of the article of EX 156.

OSISO block copolymer from PE 22 was dissolved at 1 wt % in a solvent mixture of 80/20 w/w acetone/THF. PSISP block copolymer from PE 19 was dissolved at 1 wt % in a solvent mixture of 90/10 NMP/MEK. Continuous deposition was carried out using an experimental-scale roll-to-roll coating line equipped with a slot die. The coating speed was controlled at 5 feet per minute (2.5 cm/s) and the coating width was 4 inches (10.2 cm). The coating solutions were metered using a syringe pump at 1.5 to 3 mL/min onto either "PAN350" or "PV400". The acetone/THF coatings were dried out at room temperature on the line before being wound up while the NMP/MEK coated-substrate was removed from the coating line to be immersed in a water bath. Coating conditions and results are summarized in Table 35. Isoporous morphologies were observed in EX 154 (e.g., FIG. 6 shows a surface of EX 154) and EX 155 (e.g., FIG. 7 shows a surface of EX 155). EX 156 was the same coating as Ex 114 except at a different thickness and on a different substrate ("PV400"), and in this case isoporosity was not seen, but partially fused annular objects were seen (e.g., FIG. 8 shows a surface of EX 156).

TABLE 35

| Example | Polymer | Solvent Ratio (w/w) | Substrate | Wet thickness (mil/micometer) | Flux (LMH/bar) | Appearance by AFM |
|---|---|---|---|---|---|---|
| EX 154 | PE 22 | 80/20 Actn/THF | PAN350 | 0.47/12 | 0 | Isoporous |
| EX 155 | PE 19 | 90/10 NMP/MEK | PAN350 | 0.38/9.7 | 210 | Isoporous |
| EX 156 | PE 22 | 80/20 Actn/THF | PV400 | 0.94/24 | 42 | Partially fused annular objects |

Inkjet Deposition of Thin Film Composites

Figure 9:
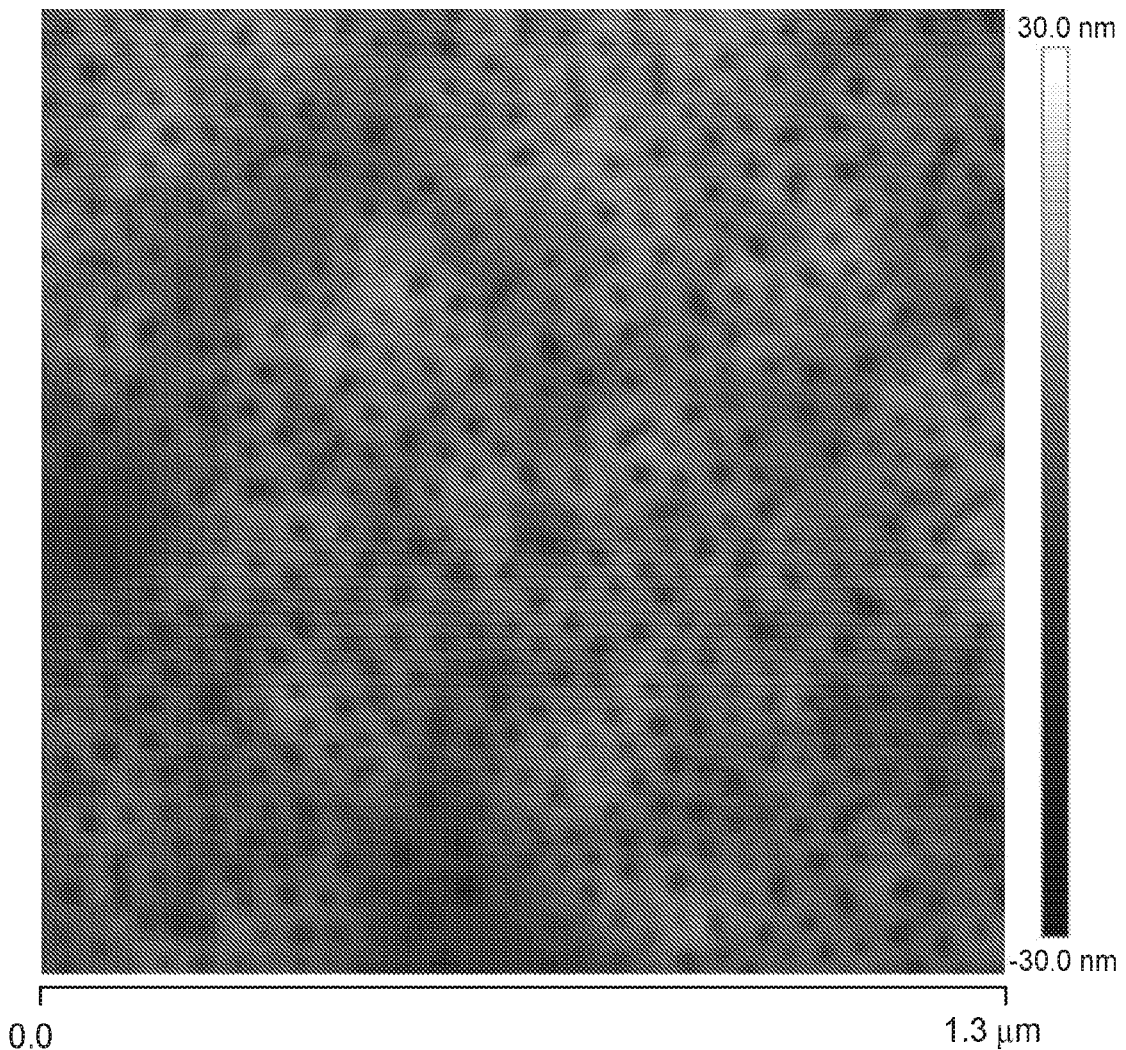
FIG. 9 is an AFM height image of a surface of the article of EX 157.

PSISP block copolymer from PE 20 was dissolved at 1 wt % in a solvent mixture of 90/10 (w/w) NMP/MEK. A benchtop materials deposition system (obtained under the trade designation "DIMATIX MATERIALS PRINTER" from FUJIFILM Dimatix, Inc., Santa Clara, CA) capable of precision jetting of fluidic materials was used to deposit the block copolymer solution in a controlled dropwise fashion onto "PAN350". Disposable piezo inkjet cartridges (obtained under the trade designation "DIMATIX MATERIALS CARTRIDGES 11610" from FUJIFILM Dimatix, Inc.) depositing 10 pL droplets were used. A coating was printed at a droplet spacing of 30 micrometers with purging every 25 passes (EX 157). After printing, the composite sheet was immersed into water to remove residual solvent. AFM showed a deposited coating that appeared isoporous (e.g., FIG. 9 shows a surface of EX 157).

Electrospray Deposition of Thin Film Composites

Figure 10:
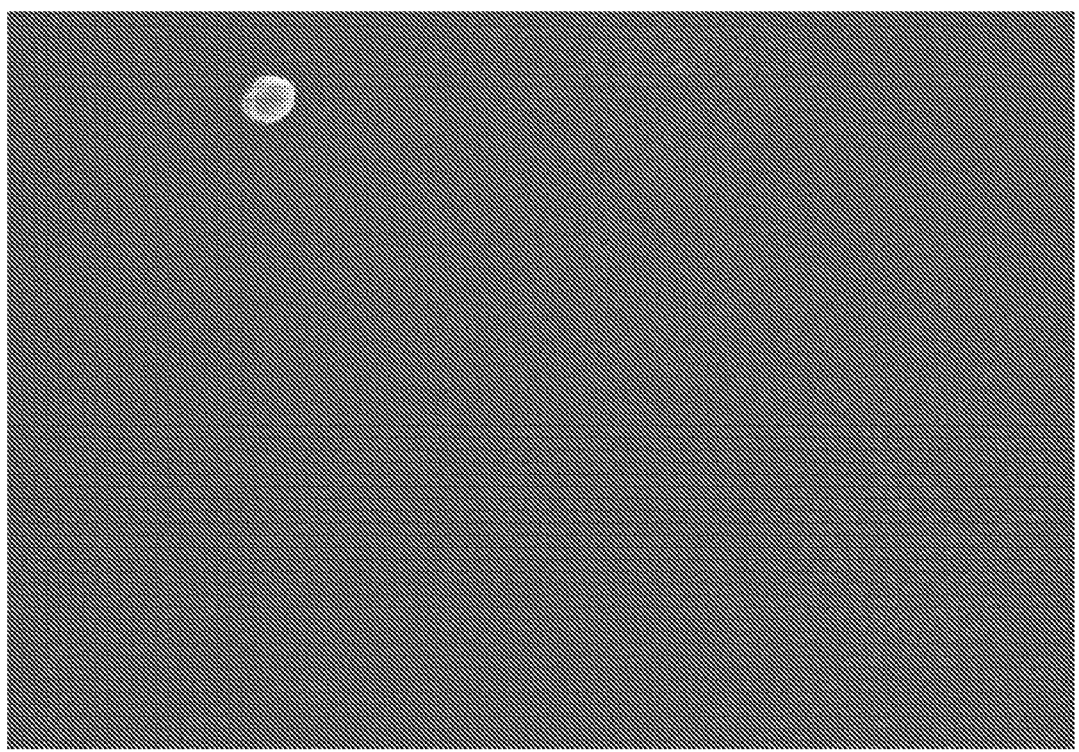
FIG. 10 is an SEM image at a magnification of 30,000× of a surface of the article of EX 158.

PSISP block copolymer from PE 20 was dissolved at a concentration of 0.1 wt % in a solvent mixture of 90/10 (w/w) acetone/THF. A custom electrospray deposition apparatus (described in Chowdhury et al. "3D Printed Polyamide Membranes for Desalination" Science 2018, 361 (6403), 682-686) was used to deposit the block copolymer solution onto "PAN350" using 10 scan layers and an accelerating voltage of 11 kV (EX 158). After the electrospray deposition process, the composite sheet was dried in air at room temperature. SEM analysis showed a deposited coating that appeared isoporous with a combination of open and closed pores (e.g., FIG. 10 shows a surface of EX 158).

What is claimed is:

1. An article comprising an isoporous membrane disposed on a porous substrate, the isoporous membrane comprising a triblock copolymer, wherein the isoporous membrane has a thickness and is isoporous throughout the thickness; and
   wherein said triblock copolymer comprises an A block comprising a poly (ethylene oxide).

2. The article of claim 1, wherein the thickness of the isoporous membrane from a major surface of the porous substrate is 1000 nanometers (nm) or less, 900 nm or less, 800 nm or less, 700 nm or less, 600 nm or less, 500 nm or less, 400 nm or less, 300 nm or less, 200 nm or less, 100 nm or less, 90 nm or less, 80 nm or less, 70 nm or less, 60 nm or less, 50 nm or less, 40 nm or less, or 30 nm or less; and 20 nm or greater, 25 nm or greater, 30 nm or greater, 40 nm or greater, 55 nm or greater, 65 nm or greater, 75 nm or greater, 85 nm or greater, 95 nm or greater, or 105 nm or greater.

3. The article of claim 1, wherein the triblock copolymer comprises a B block selected from the group consisting of styrene, p-methylstyrene, alpha-methylstyrene, poly(tert-butylstyrene), and polymethylmethacrylate.

4. The article of claim 1, wherein the triblock copolymer comprises a C block comprising a polyacrylate or a polysiloxane.

5. The article of claim 1, wherein the isoporous membrane is attached to the porous substrate.

6. The article of claim 1, wherein the porous substrate comprises pores having a mean pore diameter at a surface of the porous substrate of 500 nm or less to 1 nm or more.

7. The article of claim 1, wherein a standard deviation in pore diameter at a surface of the isoporous membrane is 4 nm or less from a mean pore diameter at the surface of the isoporous membrane when the mean pore diameter at the surface of the isoporous membrane ranges from 5 to 15 nm, the standard deviation in pore diameter at the surface of the isoporous membrane is 6 nm or less from the mean pore diameter at the surface of the isoporous membrane when the mean pore diameter at the surface of the isoporous membrane ranges from greater than 15 to 25 nm, and the standard deviation in pore diameter at the surface of the isoporous membrane is 25% or less of the mean pore diameter at the surface of the isoporous membrane when the mean pore diameter at the surface of the isoporous membrane ranges from greater than 25 to 50 nm.

8. The article of claim 1, wherein a portion of the isoporous membrane is integral with a major surface of the porous substrate.

9. The article of claim 1, wherein the isoporous membrane is spontaneously water wettable.

10. The article of claim 1, wherein the porous substrate comprises a membrane, a nonwoven substrate, or combinations thereof.

* * * * *